(12) United States Patent
Kundu et al.

(10) Patent No.: US 11,140,693 B2
(45) Date of Patent: *Oct. 5, 2021

(54) HANDLING OVERLAPPING OF PUCCH AND PUSCH FOR NEW RADIO SYSTEMS

(71) Applicant: Apple Inc., Cupertino, CA (US)

(72) Inventors: Lopamudra Kundu, Santa Clara, CA (US); Joonyoung Cho, Portland, OR (US); Gang Xiong, Portland, OR (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,775

(22) Filed: May 9, 2019

(65) Prior Publication Data

US 2019/0335485 A1    Oct. 31, 2019

Related U.S. Application Data

(63) Continuation of application No. 16/251,762, filed on Jan. 18, 2019.

(60) Provisional application No. 62/620,186, filed on Jan. 22, 2018, provisional application No. 62/710,491, filed on Feb. 16, 2018.

(51) Int. Cl.
| | |
|---|---|
| *H04W 72/12* | (2009.01) |
| *H04L 1/18* | (2006.01) |
| *H04L 25/02* | (2006.01) |
| *H04L 1/00* | (2006.01) |
| *H04W 72/04* | (2009.01) |
| *H04L 5/00* | (2006.01) |

(52) U.S. Cl.
CPC ....... *H04W 72/1242* (2013.01); *H04L 1/0026* (2013.01); *H04L 1/1819* (2013.01); *H04L 5/0051* (2013.01); *H04L 5/0055* (2013.01); *H04L 25/0226* (2013.01); *H04W 72/0413* (2013.01); *H04W 72/0446* (2013.01)

(58) Field of Classification Search
CPC ......... H04W 72/1242; H04W 72/0413; H04W 72/0446; H04L 5/0051; H04L 5/0055; H04L 1/0026; H04L 1/1819; H04L 25/0226

See application file for complete search history.

(56) References Cited

U.S. PATENT DOCUMENTS

| | | | |
|---|---|---|---|
| 9,538,481 B2* | 1/2017 | Gao | H04L 1/0073 |
| 10,158,461 B2* | 12/2018 | Li | H04L 5/001 |
| 10,772,085 B2* | 9/2020 | Yin | H04W 72/0413 |
| 2016/0226649 A1* | 8/2016 | Papasakellariou | H04L 5/006 |
| 2018/0035332 A1* | 2/2018 | Agiwal | H04W 74/0858 |
| 2019/0044639 A1* | 2/2019 | Ouchi | H04L 5/001 |

(Continued)

*Primary Examiner* — Rasheed Gidado
(74) *Attorney, Agent, or Firm* — Fay Kaplun & Marcin, LLP

(57) ABSTRACT

Briefly, in accordance with one or more embodiments, an apparatus of a user equipment (UE) to operate in a New Radio (NR) system comprises one or more baseband processors to determine if two or more uplink signals partially overlap, determine a multiplexing rule, a dropping rule, or a priority rule for the two or more uplink signals, and to multiplex, drop, or prioritize the two or more uplink signals for transmission according to the multiplexing rule, dropping rule, or priority rule, and a memory to store two or more uplink signals.

10 Claims, 15 Drawing Sheets

(56) References Cited

U.S. PATENT DOCUMENTS

2019/0380124 A1* 12/2019 Kim ................ H04L 5/0048
2020/0036501 A1* 1/2020 Gao ............... H04W 72/0493

* cited by examiner

HANDLING OVERLAPPING OF PUCCH AND PUSCH FOR NEW RADIO SYSTEMS

CROSS-REFERENCE TO RELATED APPLICATIONS

The present application claims the benefit of U.S. application Ser. No. 16/251,762 filed Jan. 18, 2019, entitled HANDLING OVERLAPPING OF PUCCH AND PUSCH FOR NEW RADIO SYSTEMS, which in turn claims the benefit of U.S. Provisional Application No. 62/620,186 (AA8218-Z) filed Jan. 22, 2018 and U.S. Provisional Application No. 62/710,491 (AA9043-Z) filed Feb. 16, 2018. Said application Ser. No. 16/251,762, said application No. 62/620,186, and said Application No. 62/710,491 are hereby incorporated herein by reference in their entireties.

BACKGROUND

Mobile communication has evolved significantly from early voice systems to the highly sophisticated integrated communication platform of today. The next generation wireless communication system, Fifth Generation (5G), or new radio (NR), will provide access to information and sharing of data anywhere, anytime by various users and applications. The NR standard is expected to be a unified network or system designed to meet vastly different and sometimes conflicting performance dimensions and services. Such diverse multi-dimensional requirements are driven by different services and applications. In general, NR systems will evolve based on the Third Generation Partnership Project (3GPP) Long Term Evolution Advanced (LTE-Advanced) standard with additional potential new Radio Access Technologies (RATs) to enrich lives with better, simpler, and more seamless wireless connectivity solutions. The NR standard will enable everything connected by wireless and deliver fast and rich contents and services.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
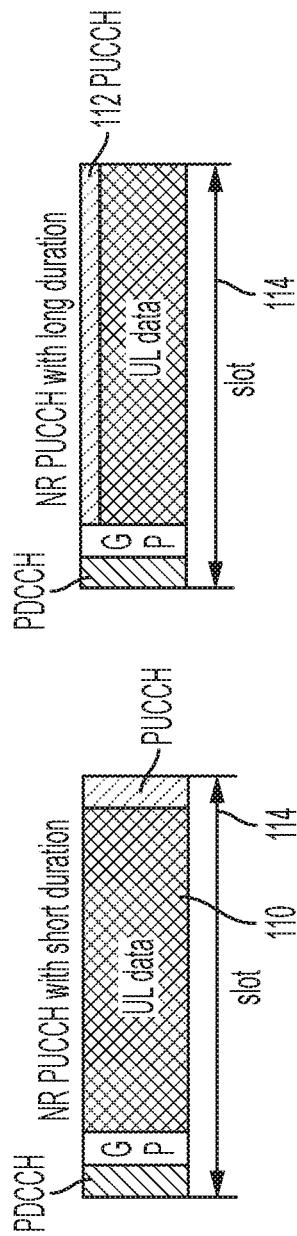
FIG. 1 is a diagram of NR PUCCH with short and long duration in an UL slot in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of a new radio (NR) physical uplink control channel (PUCCH) with short and long duration in an uplink (UL) slot in accordance with one or more embodiments will be discussed. FIG. 1 illustrates one example of NR physical uplink control channel (NR PUCCH) with short duration 110 and long duration 112 within an UL slot 114. For NR PUCCH with short duration, NR PUCCH and physical uplink shared channel (PUSCH) are multiplexed in a time division multiplexing (TDM) manner, which can be targeted for low latency applications. For NR PUCCH with long duration, multiple OFDM symbols can be allocated for NR PUCCH to increase link budget and uplink coverage for control channel. More specifically, for UL data slot, NR PUCCH and PUSCH can be multiplexed in a frequency division multiplexing (FDM) fashion.

Note that in FIG. 1, in order to accommodate the downlink (DL) to uplink (UL) switching time and round-trip propagation delay, a guard period (GP) is inserted between NR physical downlink control channel (NR PDCCH) and NR physical uplink control channel (NR PUCCH) as well as NR physical downlink control channel (NR PDCCH) and NR physical uplink shared channel (NR PUSCH).

In NR, short PUCCH (PUCCH formats 0 and 2) can span 1 or 2 OFDM symbols and long PUCCH (PUCCH formats 1, 3 and 4) can span from 4 to 14 OFDM symbols within a slot. Further, long PUCCH may span multiple slots to further enhance the coverage. In addition, for a given UE, two short PUCCHs as well as short PUCCH and long PUCCH can be multiplexed in a TDM manner in the same slot.

In NR, uplink control information can be carried by PUCCH or PUSCH. In particular, uplink control information (UCI) may include scheduling request (SR), hybrid automatic repeat request-acknowledgement (HARQ-ACK) feedback, channel state information (CSI) report, for example channel quality indicator (CQI), pre-coding matrix indicator (PMI), CSI resource indicator (CRI) and rank indicator (RI) and/or beam related information such as Layer 1 reference signal received power (L1-RSRP).

In the case when a first PUCCH carrying a first UCI type fully collides with a second PUCCH carrying a second UCI type, wherein the first PUCCH and the second PUCCH have same starting symbols and same duration, UE would multiplex the first and second UCI types into one of the first and second PUCCHs. In one example, when PUCCH format 2 carrying hybrid automatic repeat request acknowledgment (HARQ-ACK) collides with PUCCH format 0 carrying a scheduling request (SR), the user equipment (UE) would append SR after HARQ-ACK information bit and carry HARQ-ACK/SR into the PUCCH format 2.

Figure 2:
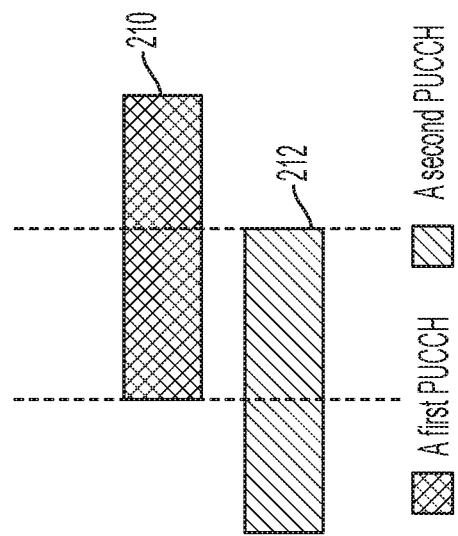
FIG. 2 is a diagram of partial overlapping of two PUCCHs in accordance with one or more embodiments.

Referring now to FIG. 2, a diagram of partial overlapping of two PUCCHs in accordance with one or more embodiments will be discussed. In the case of partial overlapping of two PUCCHs, wherein a first PUCCH 210 and a second PUCCH 212 do not have same starting symbol and/or duration, certain mechanisms need to be defined to allow UE to multiplex one or multiple UCI types into one PUCCH, in order to ensure alignment between NR Fifth Generation (5G) NodeB (gNB) and UE. FIG. 2 illustrates one example of partial overlapping of two PUCCHs.

As discussed in further detail herein, methods of handling overlapping of PUCCH and PUSCH for NR are disclosed, where the overlapping PUCCH and/or PUSCH may span over one slot or more than one slots. One or more embodiments of handling overlapping of PUCCH and PUSCH for NR may include handling overlapping of multiple PUCCHs, overlapping of HARQ-ACK and SR PUCCHs, overlapping of HARQ-ACK/channel state information (CSI) and SR PUCCHs, overlapping of HARQ-ACK PUCCHs for semi-persistent and dynamic PDSCHs, and/or handling overlapping of PUCCH and PUSCH.

Handling Collision in Case of Partial Overlapping Between Multiple PUCCHs

Partial overlapping of multiple PUCCHs can occur when multiple PUCCH transmissions configured with different PUCCH resources occur within a slot and they have the following properties: the same starting or ending symbol but different durations for transmission, different starting symbols and same or different duration(s) for transmission, different ending symbols and same or different duration(s) for transmission, and/or different starting and ending symbols which implies different durations as well.

In the case when PUCCH format 2/3/4 carrying HARQ-ACK and/or CSI feedback and PUCCH format 0/1 carrying a single SR collide partially in time, the various collision scenarios that may occur are described as follows. The HARQ-ACK can be one for a PDSCH scheduled dynamically by PDSCH, say simply dynamic PDSCH henceforth, and in another case, one for a PDSCH scheduled in a semi-persistent manner which is transmitted periodically without being scheduled by PDCCH once activated, say simply semi-persistent PDSCH henceforth. Also, HARQ-ACK for other cases can be included.

Figure 3A:
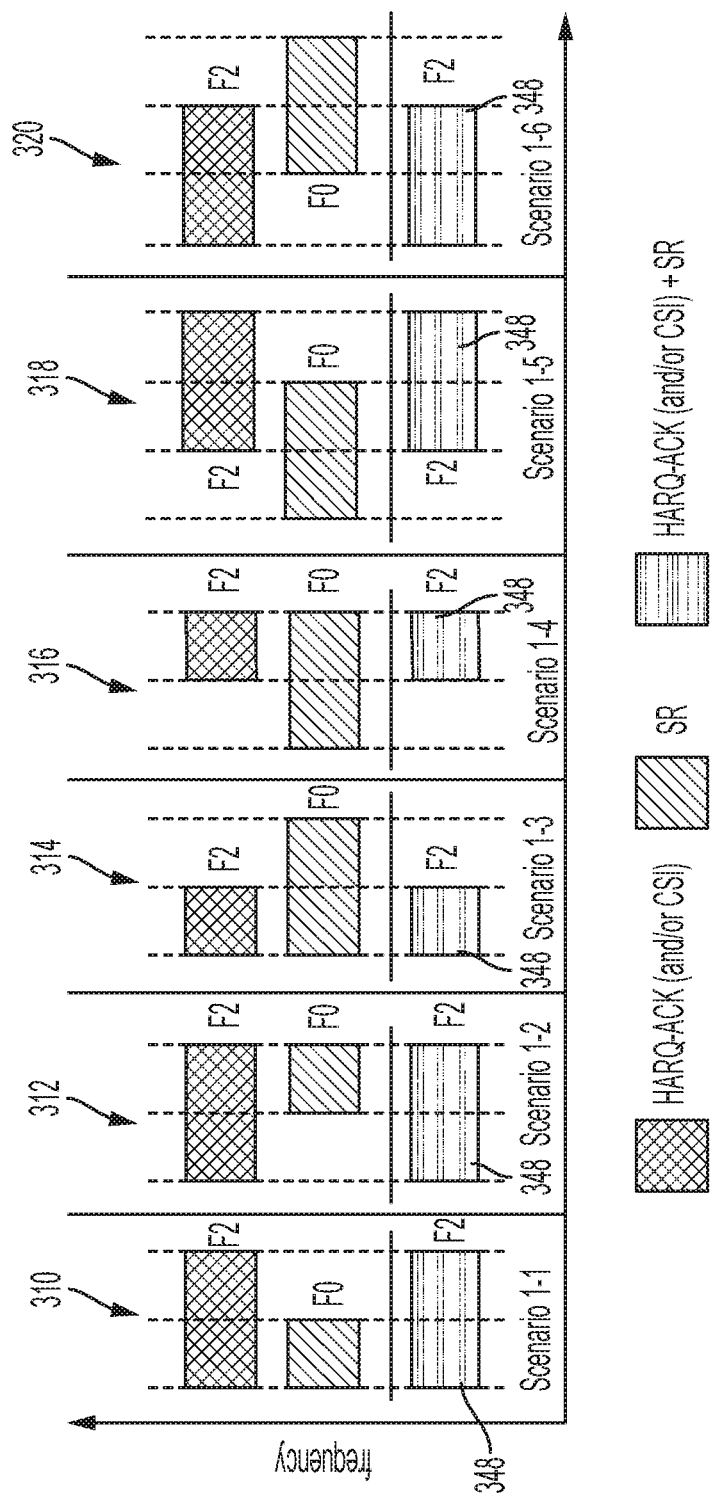
FIG. 3A is a diagram of partial overlapping of two PUCCHs of format 2 and format 0 in accordance with one or more embodiments.
Figure 3B:
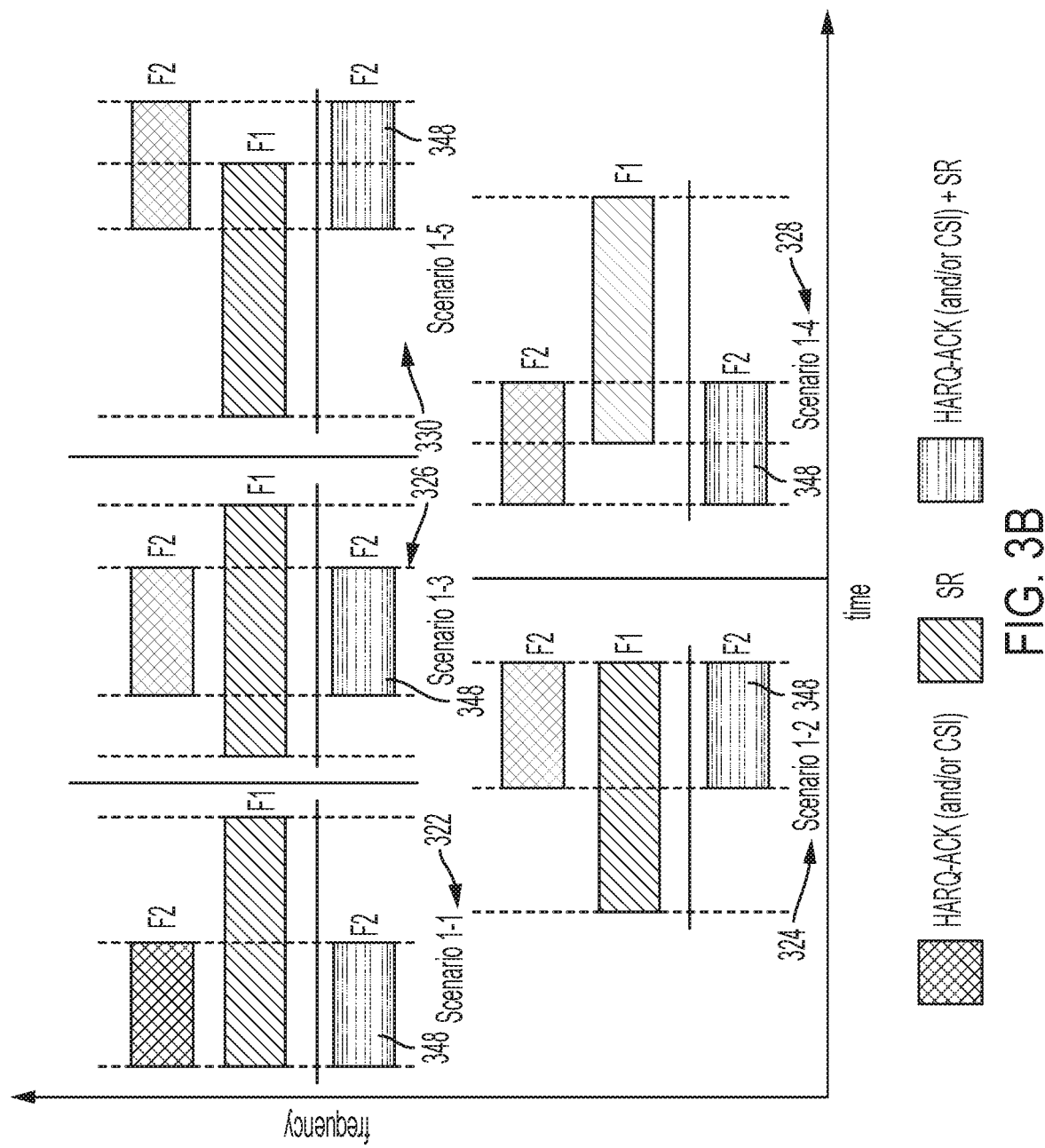
FIG. 3B is a diagram of partial overlapping of two PUCCHs of format 2 and format 1 in accordance with one or more embodiments.
Figure 3C:
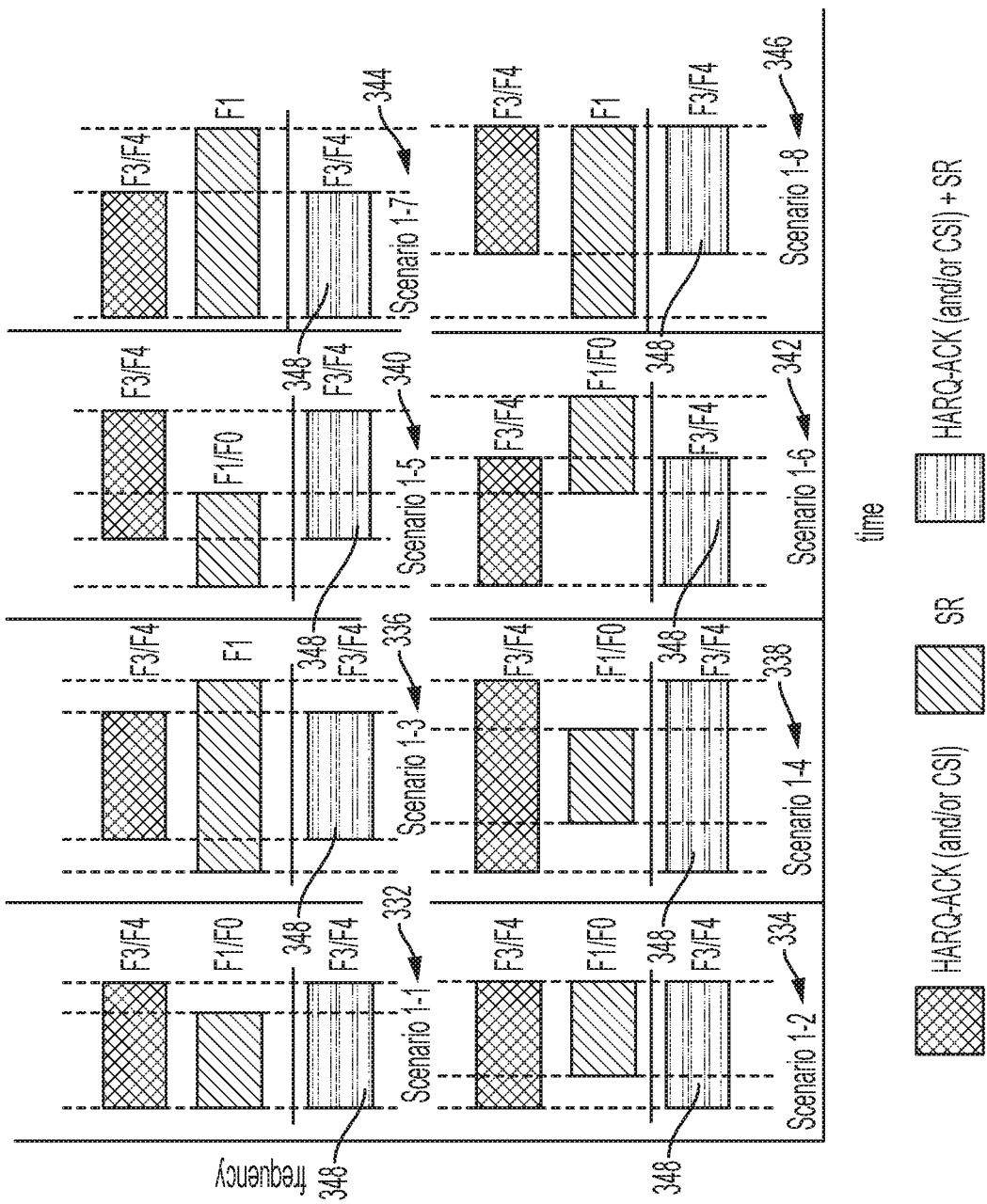
FIG. 3C is a diagram of partial overlapping of two PUCCHs of format 3/4 and format 0/1 in accordance with one or more embodiments.

Handling Collision in Case of Partial Overlapping Between PUCCH Resources Configured with PUCCH Format 2/3/4 for HARQ-ACK and/or CSI Transmission and PUCCH Format 0/1 for SR Transmission In one embodiment of the invention, a PUCCH transmission with a payload size of more than 2 UCI bits configured with PUCCH format 2/3/4 carrying HARQ-ACK (and/or CSI feedback) may partially overlap within a slot with an SR transmission semi-statically configured with PUCCH format 0/1, where the SR transmission may be configured to start either earlier than, or later than, or at the same time as the HARQ-ACK (and/or CSI) transmission, as illustrated in FIG. 3A, FIG. 3B, and FIG. 3C below.

In case, even when the SR transmission is configured to start at the same time as the HARQ-ACK and/or CSI transmission, i.e. the starting symbols of SR and HARQ-ACK and/or CSI resources overlap, the duration of PUCCH resources configured for SR and HARQ-ACK and/or CSI may be different. In other cases, wherein the SR starts either earlier or later than HARQ-ACK and/or CSI, the duration of PUCCH resources configured for SR and HARQ-ACK and/or CSI may be either the same or different.

Referring now to FIG. 3A, a diagram of partial overlapping of two PUCCHs of format 2 and format 0 in accordance with one or more embodiments will be discussed. In FIG. 3A, different scenarios of partial overlap between two PUCCHs configured with format 2 for HARQ-ACK (and/or CSI) and format 0 for SR are illustrated, where the labels F0 and F2 in the figure indicate PUCCH format 0 and PUCCH format 2 respectively.

In scenario 1-1 at 310, a 2-symbol PUCCH format 2 partially overlaps in its first symbol with a 1-symbol PUCCH format 0 (SR starts at the same time as HARQ-ACK and/or CSI). In scenario 1-2 at 312, a 2-symbol PUCCH format 2 partially overlaps in its second symbol with a 1-symbol PUCCH format 0 (SR starts after HARQ-ACK and/or CSI). In scenario 1-3 at 314, a 1-symbol PUCCH format 2 partially overlaps with a 2-symbol PUCCH format 0 in its first symbol (SR starts at the same time as HARQ-ACK and/or CSI). In scenario 1-4 at 316, a 1-symbol PUCCH format 2 partially overlaps with a 2-symbol PUCCH format 0 in its second symbol (SR starts before HARQ-ACK and/or CSI). In scenario 1-5 at 318, a 2-symbol PUCCH format 2 partially overlaps in its first symbol with a 2-symbol PUCCH format 0 (SR starts before HARQ-ACK and/or CSI). In scenario 1-6 at 320, a 2-symbol PUCCH format 2 partially overlaps in its second symbol with a 2-symbol PUCCH format 0 (SR starts after HARQ-ACK and/or CSI).

In these scenarios (1-1 through 1-6), SR may be multiplexed with HARQ-ACK and/or CSI bits onto the PUCCH for the HARQ-ACK and/or CSI by either appending 1 bit at the end of the HARQ-ACK bits, in case either HARQ-ACK or HARQ-ACK and CSI feedback is configured with PUCCH format 2, or appending 1 bit at the beginning of CSI bits, in case only CSI feedback is configured with PUCCH format 2, as indicated by rectangle 348 in FIG. 3B. The starting location and the duration of the transmitted PUCCH can be the same as the PUCCH for the HARQ-ACK even with multiplexing the SR bit, and may not be affected by the starting location and duration of the PUCCH for the SR. The appended bit may indicate the state of SR being present or absent and take the value 0/1 for negative/positive SR.

Referring now to FIG. 3B, a diagram of partial overlapping of two PUCCHs of format 2 and format 1 in accordance with one or more embodiments will be discussed. In FIG. 3B, different scenarios of partial overlap between two PUCCHs configured with format 2 (for HARQ-ACK and/or CSI) and format 1 (for SR) are illustrated, where the labels F1 and F2 in the figure indicate PUCCH format 1 and PUCCH format 2 respectively. In scenario 1-1 at 322, a 1-symbol or 2-symbol PUCCH format 2 partially overlaps with an M-symbol PUCCH format 1 ($14 \leq M \leq 4$), where the starting symbols of two PUCCH resources overlap in time (SR starts at the same time as HARQ-ACK and/or CSI). In scenario 1-2 at 324, a 1-symbol or 2-symbol PUCCH format 2 partially overlaps with an M-symbol PUCCH format 1 ($14 \leq M \leq 4$), where the end symbols of two PUCCH resources overlap in time (SR starts before HARQ-ACK and/or CSI). In scenario 1-3 at 326, a 1-symbol or 2-symbol PUCCH format 2 partially overlaps with an M-symbol PUCCH format 1 ($14 \leq M \leq 4$) in the middle of its duration, where neither the starting symbols nor the end symbols of these two PUCCH resources overlap in time (SR starts before HARQ-ACK and/or CSI). In scenario 1-4 at 328, a 2-symbol PUCCH format 2 partially overlaps in its second symbol with an M-symbol PUCCH format 1 ($14 \leq M \leq 4$), where the starting symbol of PUCCH format 1 resource overlaps in time with the end symbol of PUCCH format 2 resource (SR starts after HARQ-ACK and/or CSI). In scenario 1-5 at 330, a 2-symbol PUCCH format 2 partially overlaps in its first symbol with an M-symbol PUCCH format 1 ($14 \leq M \leq 4$), where the starting symbol of PUCCH format 2 resource overlaps in time with the end symbol of PUCCH format 1 resource (SR starts before HARQ-ACK and/or CSI).

In these scenarios (1-1 through 1-5), SR may be multiplexed with HARQ-ACK and/or CSI bits onto the PUCCH resource for the HARQ-ACK and/or CSI by either appending 1 bit at the end of the HARQ-ACK bits (in case either HARQ-ACK or HARQ-ACK and CSI feedback is configured with PUCCH format 2) or appending 1 bit at the beginning of CSI bits (in case only CSI feedback is configured with PUCCH format 2), as indicated by green rectangles in FIG. 3B. The starting location and the duration of the transmitted PUCCH can be the same as the PUCCH for the HARQ-ACK even with multiplexing the SR bit, and may not be affected by the starting location and duration of the PUCCH for the SR. The appended bit may indicate the state of SR being present or absent and take the value 0/1 for negative/positive SR.

Referring now to FIG. 3C, a diagram of partial overlapping of two PUCCHs of format 3/4 and format 0/1 in accordance with one or more embodiments will be discussed. In FIG. 3C, different scenarios of partial overlap between two PUCCHs configured with format 3/4 (for HARQ-ACK and/or CSI) and format 0/1 (for SR) are illustrated, where the labels F3/F4 and F1/F0 in the figure indicate PUCCH format 3/4 and PUCCH format 1/0 respectively.

In scenario 1-1 at 332, an N-symbol PUCCH format 3/4 ($14 \leq N \leq 4$), partially overlaps with an M-symbol PUCCH format 1/0 ($14 \leq M \leq 4$ for format 1 and $1 \leq M \leq 2$ for format 0), where the starting symbols of these two PUCCH resources are aligned in time and HARQ-ACK (and/or CSI) resource has longer duration in time than SR resource, i.e. M<N (SR starts at the same time as HARQ-ACK and/or CSI). In scenario 1-2 at 334, an N-symbol PUCCH format 3/4 ($14 \leq N \leq 4$), partially overlaps with an M-symbol PUCCH format 1/0 ($14 \leq M \leq 4$ for format 1 and $1 \leq M \leq 2$ for format 0), where the last symbols of these two PUCCH resources are aligned in time and HARQ-ACK (and/or CSI) resource has longer duration in time than SR resource, i.e. M<N (SR starts after HARQ-ACK and/or CSI). In scenario 1-3 at 336, an N-symbol PUCCH format 3/4 ($14 \leq N \leq 4$), partially overlaps with an M-symbol PUCCH format 1 ($14 \leq M \leq 4$) in the middle of its duration, where neither the starting symbols nor the end symbols of these two PUCCH resources overlap in time and HARQ-ACK (and/or CSI) resource has smaller duration in time than SR resource, i.e. M>N (SR starts before HARQ-ACK and/or CSI). In scenario 1-4 at 338, an M-symbol PUCCH format 1/0 ($14 \leq M \leq 4$ for format 1 and $1 \leq M \leq 2$ for format 0) partially overlaps with an N-symbol PUCCH format 3/4 ($14 \leq N \leq 4$) in the middle of its duration, where neither the starting symbols nor the end symbols of these two PUCCH resources overlap in time and HARQ-ACK (and/or CSI) resource has longer duration in time than SR resource, i.e. M<N (SR starts after HARQ-ACK and/or CSI). In scenario 1-5 at 340, an N-symbol PUCCH format 3/4 ($14 \leq N \leq 4$), partially overlaps with an M-symbol PUCCH format 1/0 ($14 \leq M \leq 4$ for format 1 and $1 \leq M \leq 2$ for format 0), where M<N if SR is configured with PUCCH format 0 and M may be equal to, longer or shorter than N if SR is configured with PUCCH format 1. This scenario is similar to scenario 1-3 with the difference being that here SR resource (PUCCH format 0/1) ends before HARQ-ACK and/or CSI resource (PUCCH format 3/4), whereas in scenario 1-3, the SR resource (PUCCH format 1) ends after HARQ-ACK and/or CSI resource (PUCCH format 3/4). Here SR starts before HARQ-ACK and/or CSI.

In scenario 1-6 at 342, an N-symbol PUCCH format 3/4 ($14 \leq N \leq 4$), partially overlaps with an M-symbol PUCCH format 1/0 ($14 \leq M \leq 4$ for format 1 and $1 \leq M \leq 2$ for format 0), where M<N if SR is configured with PUCCH format 0 and M may be equal to, longer than or shorter than N if SR is configured with PUCCH format 1. This scenario is similar to scenario 1-3 as well, with the difference being that here SR resource (PUCCH format 0/1) starts after HARQ-ACK and/or CSI resource (PUCCH format 3/4), whereas in scenario 1-3, the SR resource (PUCCH format 1) starts before HARQ-ACK and/or CSI resource (PUCCH format 3/4). In scenario 1-7 at 344, an N-symbol PUCCH format 3/4 ($14 \leq N \leq 4$), partially overlaps with an M-symbol PUCCH format 1 ($14 \leq M \leq 4$) where the starting symbols of two PUCCH resources overlap in time. This scenario is similar to scenario 1-1, with the difference being that HARQ-ACK (and/or CSI) resource has smaller duration in time than SR resource, i.e. M>N and hence SR resource is configured with PUCCH format 1, whereas in scenario 1-1 SR resource can be configured with either PUCCH format 1 or PUCCH format 0 since M<N in that case. Here, SR starts at the same time as HARQ-ACK and/or CSI. In scenario 1-8 at 346, an N-symbol PUCCH format 3/4 ($14 \leq N \leq 4$), partially overlaps with an M-symbol PUCCH format 1 ($14 \leq M \leq 4$), where the last symbols of two PUCCH resources overlap in time. This scenario is similar to scenario 1-2, with the difference being that HARQ-ACK (and/or CSI) resource has smaller duration in time than SR resource, i.e. M>N and hence SR resource is configured with PUCCH format 1, whereas in scenario 1-2 SR resource can be configured with either PUCCH format 1 or PUCCH format 0 since M<N in that case. Here, SR starts before HARQ-ACK and/or CSI.

In these scenarios (1-1 through 1-8), SR may be multiplexed with HARQ-ACK and/or CSI bits onto the PUCCH for the HARQ-ACK and/or CSI by either appending 1 bit at the end of the HARQ-ACK bits, in case either HARQ-ACK or HARQ-ACK and CSI feedback is configured with PUCCH format 3/4, or appending 1 bit at the beginning of CSI bits, in case only CSI feedback is configured with PUCCH format 3/4, as indicated by green rectangles in FIG. 3C. The starting location and the duration of the transmitted PUCCH can be the same as the PUCCH for the HARQ-ACK even with multiplexing the SR bit, and may not be affected by the starting location and duration of the PUCCH for the SR. The appended bit may indicate the state of SR being present or absent and take the value 0/1 for negative/positive SR.

In another embodiment, a PUCCH transmission with a payload size of more than 2 UCI bits configured with PUCCH format 2/3/4 carrying HARQ-ACK (and/or CSI feedback) may partially overlap within a slot with X PUCCH resources (X>1), each being semi-statically configured for SR transmission with PUCCH format 0/1. In this case, to select one SR amongst the K-configured SRs and multiplex with HARQ-ACK and/or CSI bits, a string of X number of bits, indicating the negative SR state and which SR is transmitted among X PUCCH resources, may be appended either at the end of the HARQ-ACK bits, in case either HARQ-ACK or HARQ-ACK and CSI feedback is configured with PUCCH format 2/3/4, or at the beginning of CSI bits, in case only CSI feedback is configured with PUCCH format 2/3/4, and transmitted on the HARQ-ACK and/or CSI PUCCH resource. Here, the string of X bits can indicate which of the X configured SRs are chosen for multiplexing, depending on where the "1" bit, indicating a positive SR, occurs in the string of X bits. If the chosen SR is "negative", then the string of X bits may be an all 0 string.

Figure 4A:
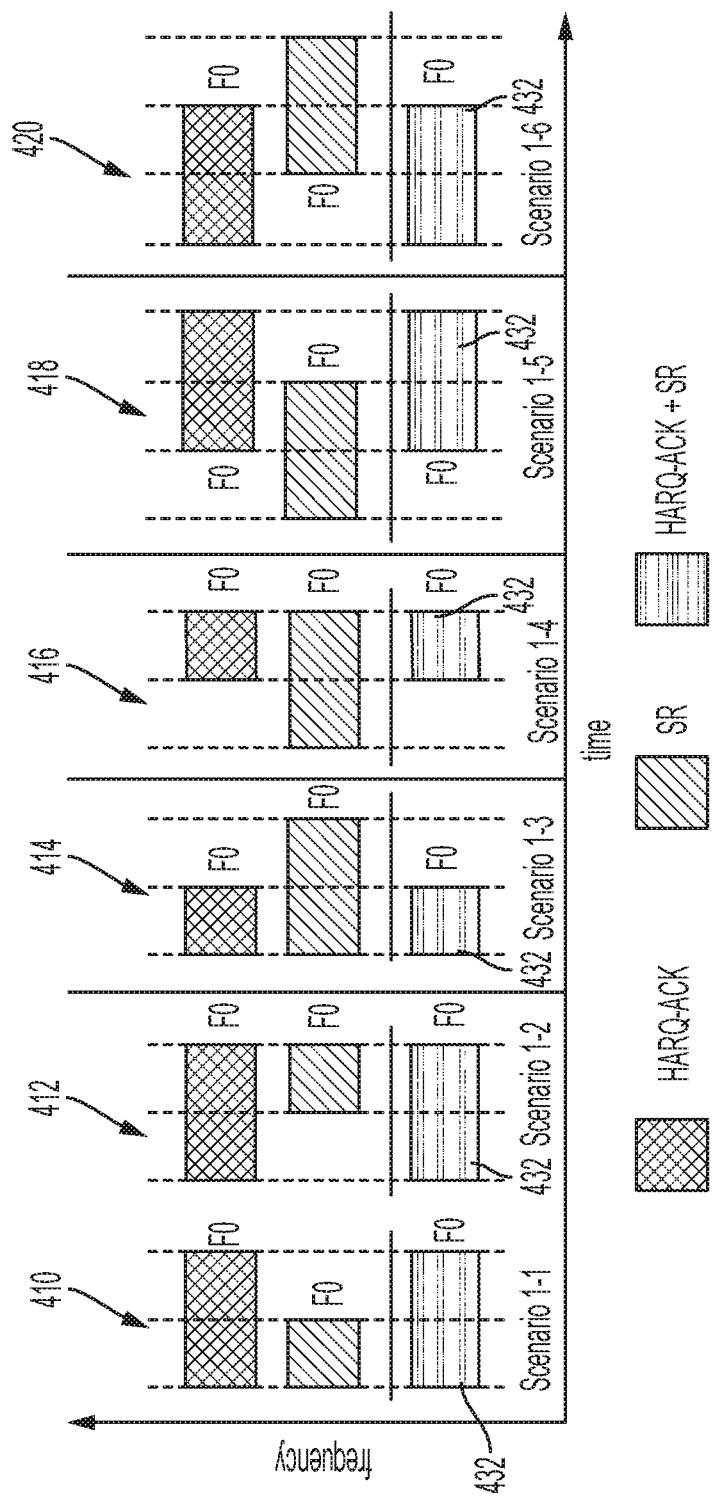
FIG. 4A is a diagram of partial overlapping of two PUCCHs of format 0 and format 0 in accordance with one or more embodiments.
Figure 4B:
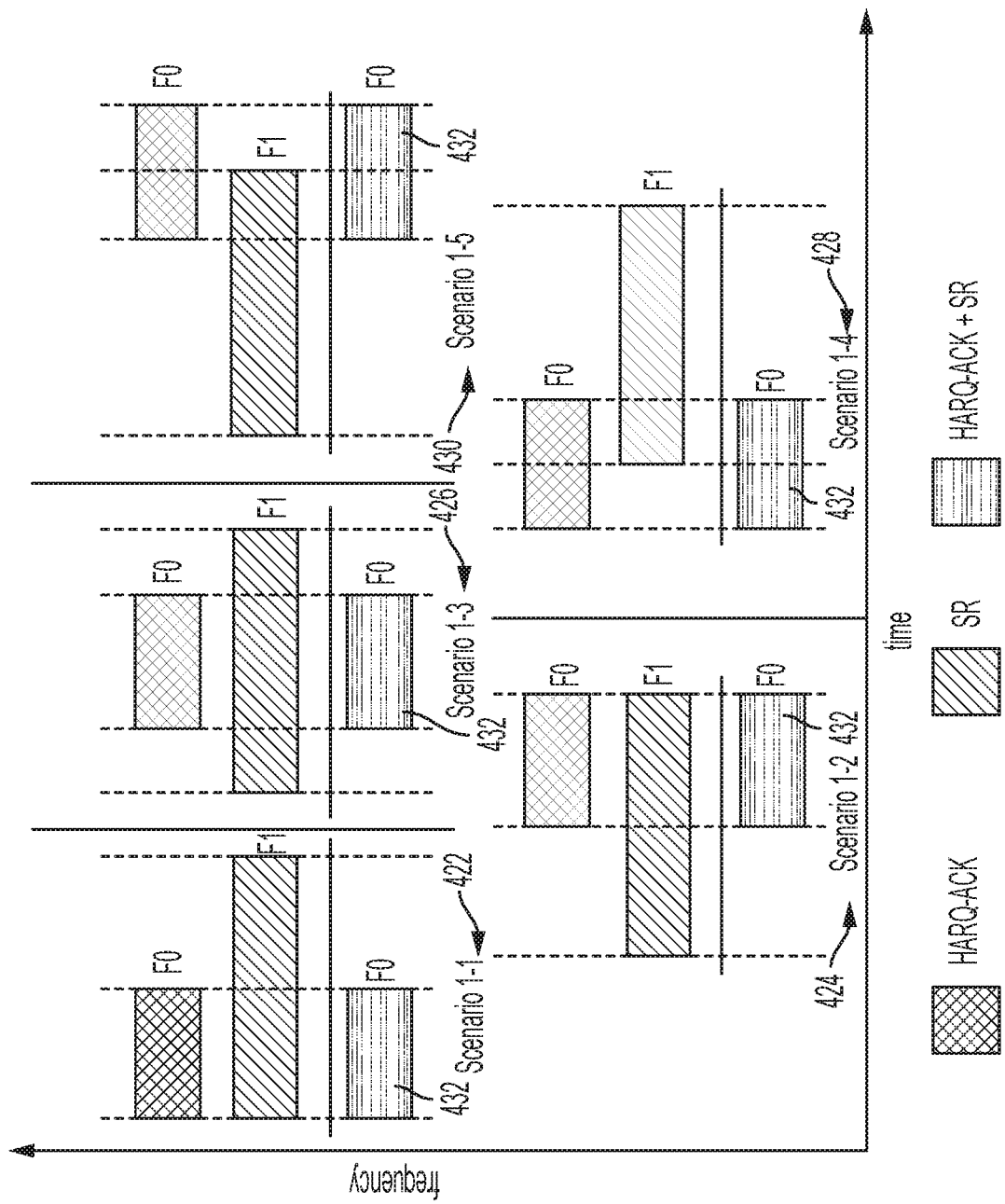
FIG. 4B is a diagram of partial overlapping of two PUCCHs of format 0 and format 1 in accordance with one or more embodiments.

Handling Collision in Case of Partial Overlapping Between PUCCH Resources Configured with PUCCH Format 0 for HARQ-ACK Transmission and PUCCH Format 0/1 for SR Transmission Referring now to FIG. 4A, a diagram of partial overlapping of two PUCCHs of format 0 and format 0 in accordance with one or more embodiments will be discussed. In one embodiment, a PUCCH transmission with a payload size of 1-2 UCI bits configured with PUCCH format 0 carrying HARQ-ACK may partially overlap within a slot with an SR transmission semi-statically configured with PUCCH format 0/1, where the SR transmission may be configured to start either earlier than, or later than, or at the same time as the HARQ-ACK, as illustrated in FIG. 4A and FIG. 4B. In the case, even when the SR transmission is configured to start at the same time as the HARQ-ACK transmission, wherein the starting symbol of SR and HARQ-ACK resources overlap, the duration of PUCCH resources configured for SR and HARQ-ACK may be different. In other cases, wherein SR starts either earlier or later than HARQ-ACK, the duration of PUCCH resources configured for SR and HARQ-ACK may be either the same or different.

In FIG. 4A, different scenarios of partial overlap between two PUCCHs configured with format 0 for HARQ-ACK and format 0 for SR are illustrated, where the label F0 in the figure indicates PUCCH format 0.

In scenario 1-1 at 410, a 2-symbol PUCCH format 0 carrying HARQ-ACK partially overlaps in its first symbol with a 1-symbol PUCCH format 0 semi-statically configured for SR (SR starts at the same time as HARQ-ACK). In scenario 1-2 at 412, a 2-symbol PUCCH format 0 carrying HARQ-ACK partially overlaps in its second symbol with a 1-symbol PUCCH format 0 semi-statically configured for SR (SR starts after HARQ-ACK). In scenario 1-3 at 414, a 1-symbol PUCCH format 0 carrying HARQ-ACK partially overlaps with a 2-symbol PUCCH format 0 semi-statically configured for SR in its first symbol (SR starts at the same time as HARQ-ACK). In scenario 1-4 at 416, a 1-symbol PUCCH format 0 carrying HARQ-ACK partially overlaps with a 2-symbol PUCCH format 0 semi-statically configured for SR in its second symbol (SR starts before HARQ-ACK). In scenario 1-5 at 418, a 2-symbol PUCCH format 0 carrying HARQ-ACK partially overlaps in its first symbol with a 2-symbol PUCCH format 0 semi-statically configured for SR (SR starts before HARQ-ACK). In scenario 1-6 at 420, a 2-symbol PUCCH format 0 carrying HARQ-ACK partially overlaps in its second symbol with a 2-symbol PUCCH format 0 semi-statically configured for SR (SR starts after HARQ-ACK).

In these scenarios (1-1 through 1-6), SR may be multiplexed with HARQ-ACK on the HARQ-ACK PUCCH resource, as illustrated by green rectangles in FIG. 4-1. For instance, the cyclic shifts of either HARQ-ACK shown in Table 1-1 and Table 1-2 below for negative SR, or cyclic shift of HARQ-ACK incremented by 1 or 3 as shown in Table 1-3 and Table 1-4 below for positive SR, may be used for transmission of a base sequence which can be a length-12 low peak-to-average power ratio (PAPR), computer generated sequence (CGS) on the HARQ-ACK PUCCH resource, where $C_{initial}$ is an initial cyclic shift which may be provided by higher layer signaling.

TABLE 1-1

Mapping pattern for 1-bit HARQ-ACK

| HARQ-ACK | NACK | ACK |
|---|---|---|
| Cyclic shift | $C_{inital}$ | $(C_{inital} + 6)\mod 12$ |

TABLE 1-2

Mapping pattern for 2-bit HARQ-ACK

| HARQ-ACK | NACK, NACK | NACK, ACK | ACK, ACK | ACK, NACK |
|---|---|---|---|---|
| Cyclic shift | $C_{inital}$ | $(C_{inital} + 3)\mod 12$ | $(C_{inital} + 6)\mod 12$ | $(C_{inital} + 9)\mod 12$ |

TABLE 1-3

Mapping pattern for 1-bit HARQ-ACK and positive SR

| HARQ-ACK | NACK | ACK |
|---|---|---|
| Cyclic shift | $(CS_{intitial} + 3)\mod 12$ | $(CS_{intitial} + 9)\mod 12$ |

TABLE 1-4

Mapping pattern for 2-bit HARQ-ACK and positive SR

| HARQ-ACK | NACK, NACK | NACK, ACK | ACK, ACK | ACK, NACK |
|---|---|---|---|---|
| Cyclic shift | $(CS_{intitial} + 1) \bmod 12$ | $(CS_{intitial} + 4) \bmod 12$ | $(CS_{intitial} + 7) \bmod 12$ | $(CS_{intitial} + 10) \bmod 12$ |

If HARQ-ACK PUCCH resource is configured with a 2-symbol PUCCH format 0, then the same sequence (the cyclic shift of which may be chosen based on the SR state (positive/negative), number of HARQ-ACK bit(s) (1 or 2) and type of each HARQ-ACK bit (ACK or NACK) and can be repeatedly transmitted on the two consecutive symbols.

Referring now to FIG. 4B, a diagram of partial overlapping of two PUCCHs of format 0 and format 1 in accordance with one or more embodiments will be discussed. In FIG. 4B, different scenarios of partial overlap between two PUCCHs configured with format 0 for HARQ-ACK and format 1 for SR are illustrated, where the labels F1 and F0 in the figure indicate PUCCH format 1 and PUCCH format 0 respectively.

In scenario 1-1 at 422, a 1-symbol or 2-symbol PUCCH format 0 partially overlaps with an M-symbol PUCCH format 1 ($14 \leq M \leq 4$), where the starting symbols of these two PUCCH resources overlap in time (SR starts at the same time as HARQ-ACK). In scenario 1-2 at 424, a 1-symbol or 2-symbol PUCCH format 0 partially overlaps with an M-symbol PUCCH format 1 ($14 \leq M \leq 4$), where the end symbols of these two PUCCH resources overlap in time (SR starts before HARQ-ACK). In scenario 1-3 at 426, a 1-symbol or 2-symbol PUCCH format 0 partially overlaps with an M-symbol PUCCH format 1 ($14 \leq M \leq 4$) in the middle of its duration, where neither the starting symbols nor the end symbols of these two PUCCH resources overlap in time (SR starts before HARQ-ACK). In scenario 1-4 at 428, a 2-symbol PUCCH format 0 partially overlaps in its second symbol with an M-symbol PUCCH format 1 ($14 \leq M \leq 4$), where the starting symbol of PUCCH format 1 or SR resource overlaps in time with the end symbol of PUCCH format 0 or HARQ-ACK resource (SR starts after HARQ-ACK). In scenario 1-5 at 430, a 2-symbol PUCCH format 0 partially overlaps in its first symbol with an M-symbol PUCCH format 1 ($14 \leq M \leq 4$), where the starting symbol of PUCCH format 0 or HARQ-ACK resource overlaps in time with the end symbol of PUCCH format 1 or HARQ-ACK resource (SR starts before HARQ-ACK).

In these scenarios (1-1 through 1-5), SR may be multiplexed with HARQ-ACK on the HARQ-ACK PUCCH resource, as illustrated by rectangles 432 in FIG. 4B. For instance, the cyclic shifts of either HARQ-ACK, as shown in Table 1-1 and Table 1-2 above for negative SR, or cyclic shift of HARQ-ACK incremented by 1 or 3, as shown in Table 1-3 and Table 1-4 above for positive SR, may be used for transmission of a base sequence which can be a length-12 low peak-to-average power ratio (PAPR), computer generated sequence (CGS) on the HARQ-ACK PUCCH resource, where $C_{initial}$ is an initial cyclic shift which may be provided by higher layer signaling.

In another embodiment, a PUCCH transmission with a payload size of 1-2 UCI bits configured with PUCCH format 0 carrying HARQ-ACK may partially overlap within a slot with X PUCCH resources (X>1), each being semi-statically configured for SR transmission with PUCCH format 0/1. In this case, all SR resources may be dropped and only HARQ-ACK may be transmitted on the HARQ-ACK PUCCH resource.

Alternatively, one SR can be chosen from X configured SRs based on some priority rule, wherein one example may be to choose the SR whose resource has the earliest start symbol in time and if more than one SRs have the same starting symbol of an earliest occurrence instant, then one SR may be chosen based on their duration, for example either the SR with smallest duration or the SR with longest duration, and then the selected SR can be multiplexed with HARQ-ACK on HARQ-ACK PUCCH resource using the same principle of multiplexing a single SR partially overlapping with HARQ-ACK as described before.

Handling Collision in Case of Partial Overlapping Between PUCCH Resources Configured with PUCCH Format 1 for HARQ-ACK Transmission and PUCCH Format 0/1 for SR Transmission Referring now to FIG. 5, a diagram of partial overlapping of two PUCCHs of format 1 and format 0/1 in accordance with one or more embodiments will be discussed. In one embodiment, a PUCCH transmission (payload size of 1-2 UCI bits) configured with PUCCH format 1 carrying HARQ-ACK may partially overlap within a slot with an SR transmission semi-statically configured with PUCCH format 0/1, where the SR transmission may be configured to start either earlier than, or later than, or at the same time as the HARQ-ACK, as illustrated in FIG. 5.

In case, even when the SR transmission is configured to start at the same time as the HARQ-ACK transmission, wherein the starting symbol of SR and HARQ-ACK resources overlap, the duration of PUCCH resources configured for SR and HARQ-ACK may be different. In other cases, i.e. when SR starts either earlier or later than HARQ-ACK, the duration of PUCCH resources configured for SR and HARQ-ACK may be either the same or different.

Figure 5:
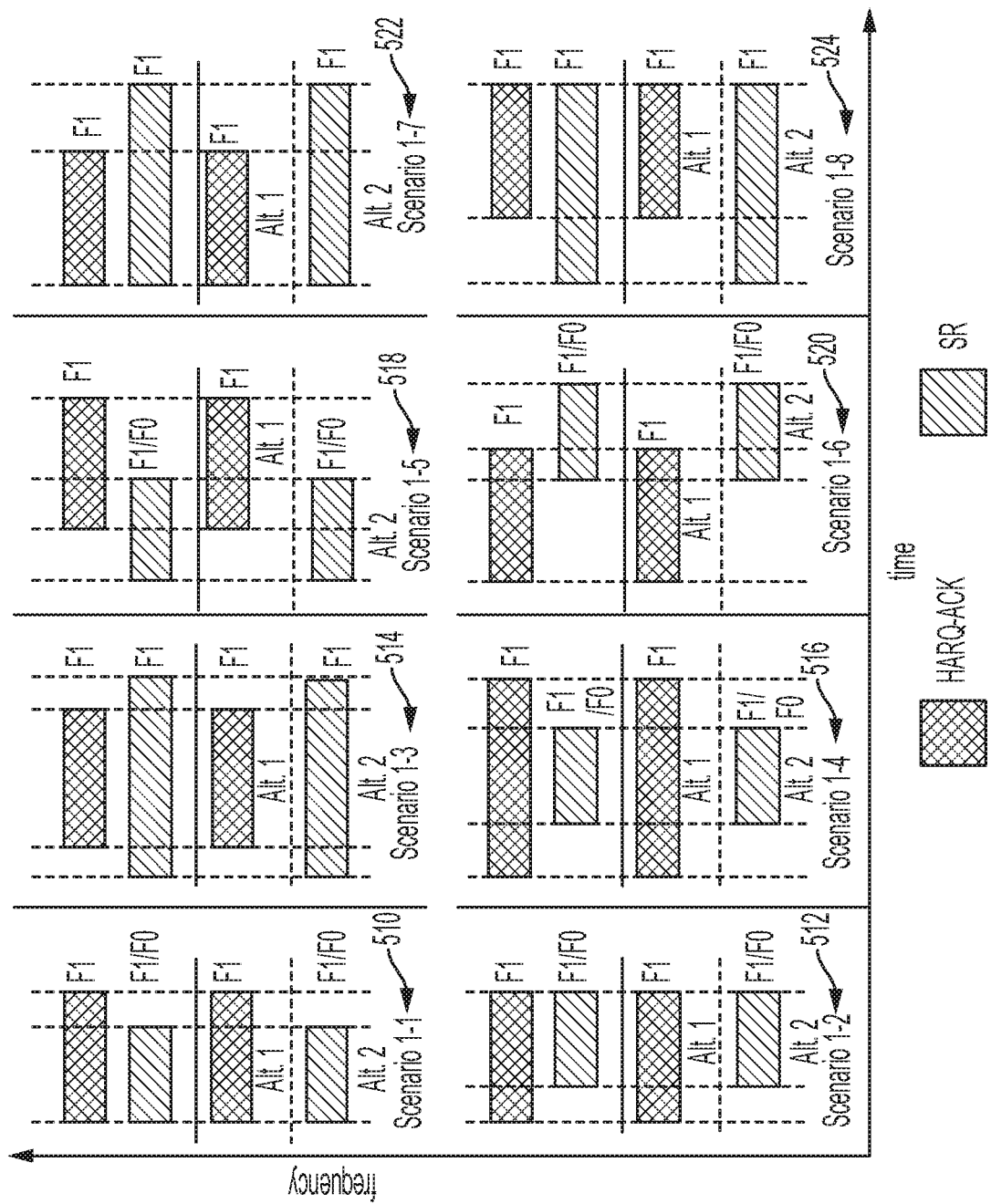
FIG. 5 is a diagram of partial overlapping of two PUCCHs of format 1 and format 0/1 in accordance with one or more embodiments.

In FIG. 5, different scenarios of partial overlap between two PUCCHs configured with format 1 for HARQ-ACK and format 0/1 for SR are illustrated, where the label F1/F0 in the figure indicates PUCCH format 1/0. In scenario 1-1 at 510, an N-symbol PUCCH format 1 ($14 \leq N \leq 4$), partially overlaps with an M-symbol PUCCH format 1/0 ($14 \leq M \leq 4$ for format 1 and $1 \leq M \leq 2$ for format 0), where the starting symbols of two PUCCH resources overlap in time and HARQ-ACK resource has longer duration in time than SR resource, i.e. M<N (SR starts at the same time as HARQ-ACK). In scenario 1-2 at 512, an N-symbol PUCCH format 1 ($14 \leq N \leq 4$), partially overlaps with an M-symbol PUCCH format 1/0 ($14 \leq M \leq 4$ for format 1 and $1 \leq M \leq 2$ for format 0), where the last symbols of two PUCCH resources overlap in time and HARQ-ACK resource has longer duration in time than SR resource, i.e. M<N (SR starts after HARQ-ACK). In scenario 1-3 at 514, an N-symbol PUCCH format 1 ($14 \leq N \leq 4$), partially overlaps with an M-symbol PUCCH format 1 ($14 \leq M \leq 4$) in the middle of its duration, where neither the starting symbols nor the end symbols of these two PUCCH resources overlap in time and HARQ-ACK resource has smaller duration in time than SR resource, i.e. M>N (SR starts before HARQ-ACK). In scenario 1-4 at 516, an M-symbol PUCCH format 1/0 ($14 \leq M \leq 4$ for format 1 and $1 \leq M \leq 2$ for format 0) partially overlaps with an N-symbol PUCCH format 1 (14≤N≤4) in the middle of its duration, where neither the starting symbols nor the end symbols of these two PUCCH resources overlap in time and HARQ-ACK resource has longer duration in time than SR resource, i.e. M<N (SR starts after HARQ-ACK).

In scenario 1-5 at 518, an N-symbol PUCCH format 1 (14≤N≤4), partially overlaps with an M-symbol PUCCH format 1/0 (14≤M≤4 for format 1 and 1≤M≤2 for format 0), where M<N if SR is configured with PUCCH format 0 and M may be equal to, longer or shorter than N if SR is configured with PUCCH format 1. This scenario is similar to scenario 1-3 with the difference being that here SR resource (PUCCH format 0/1) ends before HARQ-ACK resource (PUCCH format 1), whereas in scenario 1-3, the SR resource (PUCCH format 1) ends after HARQ-ACK resource (PUCCH format 1). Here SR starts before HARQ-ACK. In scenario 1-6 at 520, an N-symbol PUCCH format 1 (14≤N≤4), partially overlaps with an M-symbol PUCCH format 1/0 (14≤M≤4 for format 1 and 1≤M≤2 for format 0), where M<N if SR is configured with PUCCH format 0 and M may be equal to, longer than or shorter than N if SR is configured with PUCCH format 1. This scenario is similar to scenario 1-3 as well, with the difference being that here SR resource (PUCCH format 0/1) starts after HARQ-ACK resource (PUCCH format 1), whereas in scenario 1-3, the SR resource (PUCCH format 1) starts before HARQ-ACK resource (PUCCH format 1). In scenario 1-7 at 522, an N-symbol PUCCH format 1 (14≤N≤4), partially overlaps with an M-symbol PUCCH format 1 (14≤M≤4), where the starting symbols of two PUCCH resources overlap in time. This scenario is similar to scenario 1-1, with the difference being that HARQ-ACK resource has smaller duration in time than SR resource, i.e. M>N and hence SR resource is configured with PUCCH format 1, whereas in scenario 1-1 SR resource can be configured with either PUCCH format 1 or PUCCH format 0 since M<N in that case. Here, SR starts at the same time as HARQ-ACK. In scenario 1-8 at 524, an N-symbol PUCCH format 1 (14≤N≤4), partially overlaps with an M-symbol PUCCH format 1 (14≤M≤4), where the last symbols of two PUCCH resources overlap in time. This scenario is similar to scenario 1-2, with the difference being that HARQ-ACK resource has smaller duration in time than SR resource, i.e. M>N and hence SR resource is configured with PUCCH format 1, whereas in scenario 1-2 SR resource can be configured with either PUCCH format 1 or PUCCH format 0 since M<N in that case. Here, SR starts before HARQ-ACK.

In these scenarios (1-1 through 1-8), different solutions can exist depending on the relative priority of HARQ-ACK and SR. If HARQ-ACK has higher priority than SR, then SR may be dropped and only HARQ-ACK may be transmitted on the HARQ-ACK PUCCH resource (PUCCH format 1), shown as Alt. 1 in FIG. 5. Which UCI type should take a higher priority can be semi-statically configured by higher layers, e.g. by an RRC parameter to indicate the priority between HARQ-ACK and SR or indicated by PDCCH when scheduling the PDSCH corresponding to the HARQ-ACK. If SR has higher priority than HARQ-ACK, then HARQ-ACK may be dropped and SR may be transmitted on SR PUCCH resource (semi-statically configured with PUCCH format 0/1), shown as Alt. 2 in FIG. 5.

In another embodiment, a PUCCH transmission with a payload size of 1-2 UCI bits configured with PUCCH format 1 carrying HARQ-ACK may partially overlap within a slot with X PUCCH resources (X>1), each being semi-statically configured for SR transmission with PUCCH format 0/1. In this case, all SR resources may be dropped and only HARQ-ACK may be transmitted on the HARQ-ACK PUCCH resource.

Alternatively, one SR can be chosen from X configured SRs based on some priority rule (one example may be to choose the SR whose resource has the earliest start symbol in time and if more than one SRs have the same starting symbol of earliest occurrence instant then one SR may be chosen based on their duration, for example either the SR with smallest duration or the SR with longest duration, and then the selected SR can be multiplexed with HARQ-ACK on HARQ-ACK PUCCH resource using the same principle of multiplexing a single SR partially overlapping with HARQ-ACK as described before.

Handling Collision in Case of Partial Overlap of More than Two PUCCHs

Embodiments of handling collision in case of partial overlap of more than two PUCCHs are provided as follows. In one embodiment, in case when more than two PUCCHs partially collide in time, UE may only transmit one PUCCH and drop other PUCCHs. The dropping rule may depend on the UCI type carried by each PUCCH, or starting position of PUCCH transmission, or duration of more than two PUCCH transmissions.

In one option, the priority order for UCI type can be defined as: HARQ-ACK>CSI report>SR. Priority rules can be defined by different permutations of the corresponding UCI type. For instance, PUCCH carrying CSI report may be dropped in case when PUCCH carrying CSI report is earlier than and partially collides with PUCCH carrying HARQ-ACK feedback and/or SR.

In another option, PUCCH may only transmit one PUCCH with the earliest starting time. In case when more than one PUCCH have the same starting symbol, the priority order as mentioned above can be considered to drop one of more than one PUCCHs.

In another embodiment, in case when more than two PUCCHs collide in time, one PUCCH carrying both HARQ-ACK and SR can be transmitted in accordance with the aforementioned embodiments. Further, UE would drop the PUCCH carrying CSI report. Note that this may apply for a combination of certain PUCCH formats. For instance, when PUCCH format 2 carrying HARQ-ACK, PUCCH format 0 carrying SR, PUCCH format 3/4 carrying CSI report collide partially in time, UE would use X bits to indicate SR states and append after HARQ-ACK feedback and transmit the PUCCH on the PUCCH resource carrying HARQ-ACK. Meanwhile, CSI report is dropped.

In another embodiment, in case when more than two PUCCHs collide in time, UE transmits one PUCCH carrying a combined HARQ-ACK and CSI report, and drops SR. In one example, PUCCH format 1 carrying SR, PUCCH format 1 carrying HARQ-ACK, PUCCH format 3/4 carrying CSI report may collide partially in time. In this case, UE would transmit the PUCCH format 3/4 using the resource carrying CSI report to transmit a combined HARQ-ACK and CSI report and drop PUCCH carrying SR.

In another embodiment, in case when more than two PUCCHs collide in time, UE transmits one PUCCH carrying a combined HARQ-ACK, SR and CSI reports. In one example, when PUCCH format 0/1 carrying SR, PUCCH format 0/1/2/3/4 carrying HARQ-ACK and PUCCH format 2/3/4 carrying CSI report partially collide in time, if PUCCH carrying CSI report occurs later than PUCCH format carrying HARQ-ACK report, UE transmits one PUCCH for a combined HARQ-ACK/SR and CSI report on the PUCCH resource carrying CSI report.

In another example, when PUCCH format 0/1 carrying SR, PUCCH format 0/1/2/3/4 carrying HARQ-ACK and PUCCH format 2/3/4 carrying CSI report partially collide in time, if PUCCH carrying CSI report occurs earlier than PUCCH format carrying HARQ-ACK report, UE would drop CSI report and transmit HARQ-ACK and/or SR in accordance with the embodiments as mentioned above.

Handling Collision in Case of Partial Overlap of Long PUCCH with Multiple Slot Duration and Long PUCCH/PUSCH with Multiple Slot Duration Embodiment of handling collision in case of partial overlap of long PUCCH with multiple slot duration and long PUCCH/PUSCH with multiple slot duration are provided as follows. The similar mechanism can be extended and applied for the following cases: long PUCCH with multiple slot duration partially collides with long PUCCH with 1 slot duration, long PUCCH with multiple slot duration partially collides with long PUSCH with 1 slot duration, or long PUCCH with 1 slot duration partially collides with long PUSCH with multiple slot duration.

Figure 6A:
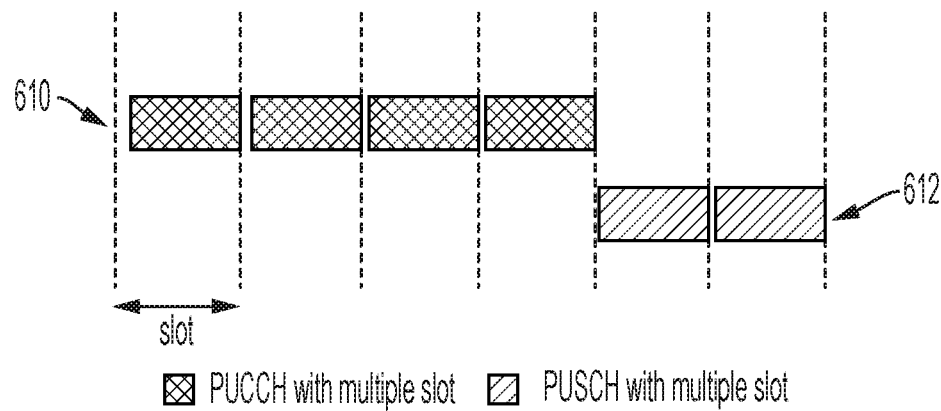
FIG. 6A is a diagram of handling partial collision of long PUCCH/PUSCH with multiple slot duration in accordance with one or more embodiments.

Referring now to FIG. 6A, a diagram of handling partial collision of long PUCCH/PUSCH with multiple slot duration in accordance with one or more embodiments will be discussed. In one embodiment, in case when long PUCCH with multiple slot duration 610 partially collides with long PUCCH/PUSCH with multiple slot duration 612 in one or more slots, one of the long PUCCH and PUSCH is dropped in the colliding slots or in all slots or deferred to the next available slots. This may apply for the scenario regardless of whether long PUCCH and PUCCH/PUSCH partially or fully collide in the concerned slot. The dropping rule can be defined similar to the embodiments as mentioned above. For instance, this can depend on which channel is transmitted first or a priority rule of UCI types or the transmission duration of long PUCCH and PUCCH/PUSCH. In one example, in case when long PUCCH with multiple slot duration is earlier than long PUSCH with multiple slot duration, long PUSCH with multiple slot duration is dropped in the collided slots or all dropped as shown in FIG. 6A.

Figure 6B:
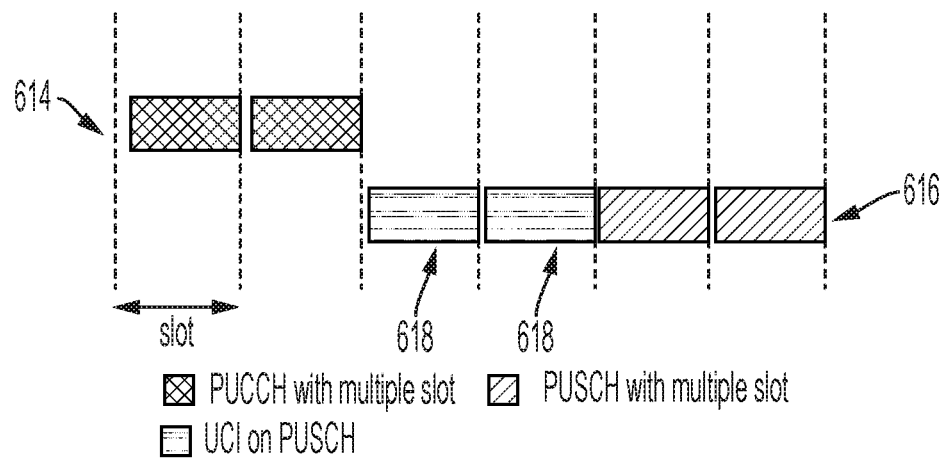
FIG. 6B is a diagram of UCI on PUSCH on collided slots in accordance with one or more embodiments.

Referring now to FIG. 6B, a diagram of UCI on PUSCH on collided slots in accordance with one or more embodiments will be discussed. In another embodiment, in case when long PUCCH with multiple slot duration 614 partially collides with long PUSCH with multiple slot duration 616 in one or more slots, UCI 618 can be multiplexed on PUSCH on the collided slots or all slots for PUSCH transmission. In another option, UCI 618 is multiplexed on PUSCH with the number of slots being the same as the number of slots for long PUCCH transmission. FIG. 6B illustrates one example of handling partial collision between long PUCCH and long PUSCH with multiple slots duration. In the example, UCI is multiplexed on PUSCH on the collided slots.

Figure 6C:
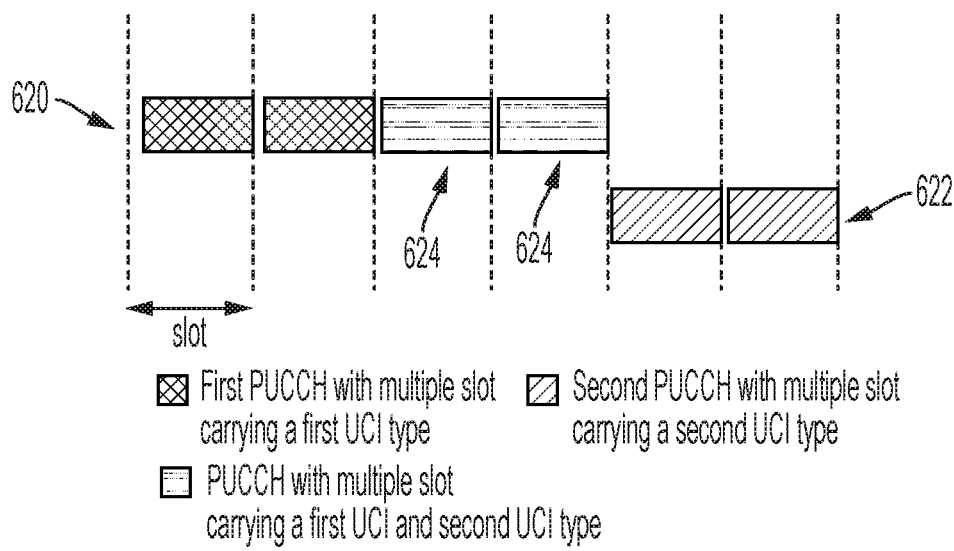
FIG. 6C is a diagram of handling partial collision of long PUCCH/PUCCH with multiple slot duration in accordance with one or more embodiments.

Referring now to FIG. 6C, a diagram of handling partial collision of long PUCCH/PUCCH with multiple slot duration in accordance with one or more embodiments will be discussed. In another embodiment, in case when long PUCCH with multiple slot duration 620 carrying a first UCI type partially collides with long PUCCH with multiple slot duration 622 carrying a second UCI type in one or more slots, the embodiments for handling collisions for PUCCH with less than or equal to 1 slot duration can apply for the transmission of long PUCCH on the collided slots. UE transmits the long PUCCH carrying corresponding UCI type in the non-colliding slots.

FIG. 6C illustrates one example of handling partial collision of long PUCCH/PUCCH with multiple slot duration. In the example, on the collided slots, UE would transmit the combined UCI type in one PUCCH 624 in accordance with the rule defined for single slot case, i.e., on first PUCCH resource.

Handling Collision of a PUCCH for HARQ-ACK for Semi-Persistent PDSCH and a PUCCH for HARQ-ACK for Dynamic PDSCH HARQ-ACK for semi-persistent PDSCH, say simply semi-persistent HARQ-ACK henceforth, can be transmitted on either PUCCH format 0 or format 1 using 1 bit. The PUCCH format and the resource for semi-persistent HARQ-ACK can be configured by higher layers or by downlink control information (DCI) or Medium Access Control (MAC) Control Element (CE) when the semi-persistent PDSCH is activated. HARQ-ACK for dynamic PDSCH, say simply dynamic HARQ-ACK henceforth, can be transmitted on PUCCH formats 0 through 4 in accordance to the configuration.

In one embodiment, a PUCCH transmission configured with PUCCH format 0 carrying 1-bit dynamic HARQ-ACK may overlap partially or fully within a slot with a semi-persistent HARQ-ACK transmission configured with PUCCH format 0/1, where the semi-persistent HARQ-ACK transmission may be configured to start either earlier than, or later than, or at the same time as the dynamic HARQ-ACK.

Then, semi-persistent HARQ-ACK may be multiplexed with dynamic HARQ-ACK on the dynamic HARQ-ACK resource for the transmission on PUCCH format 0. For instance, the cyclic shifts for cases of 2-bit HARQ-ACK, as provided in Table 1-2 or Table 1-4 above, can be used for transmission of a base sequence on the dynamic HARQ-ACK PUCCH resource which may usually have more stringent timing requirement. As to the bit mapping during the multiplexing of dynamic and semi-persistent HARQ-ACK bits, dynamic HARQ-ACK may take the 1st bit position and semi-persistent HARQ-ACK may take the 2nd bit position in the mapping for Tables 1-2 and 1-4 or vice versa. In another embodiment, the PUCCH format 0 for semi-persistent HARQ-ACK may be used to multiplex and transmit the semi-persistent and dynamic HARQ-ACK bits as described above.

In one another embodiment, a PUCCH transmission configured with PUCCH format 1 carrying 1-bit dynamic HARQ-ACK may overlap partially or fully within a slot with a semi-persistent HARQ-ACK transmission configured with PUCCH format 0/1, where the semi-persistent HARQ-ACK transmission may be configured to start either earlier than, or later than, or at the same time as the dynamic HARQ-ACK.

Semi-persistent HARQ-ACK may be multiplexed with dynamic HARQ-ACK on the dynamic HARQ-ACK resource for the transmission on PUCCH format configured for dynamic-HARQ-ACK. For instance, quadrature phase shift keying (QPSK) modulation for cases of 2-bit HARQ-ACK can be used to multiplex and transmit the semi-persistent and dynamic HARQ-ACK bits on the PUCCH format 1 resource allocated for the dynamic HARQ-ACK. Dynamic HARQ-ACK may take the 1st bit position and semi-persistent HARQ-ACK may take the 2nd bit position when deciding the QPSK constellation points or vice versa. In another embodiment, the PUCCH format 1 for semi-persistent HARQ-ACK may be used to multiplex and transmit the semi-persistent and dynamic HARQ-ACK bits using QPSK modulation as described here. If PUCCH format 0 is configured for semi-persistent HARQ-ACK transmission, the cyclic shifts for cases of 2-bit HARQ-ACK, as provided in Table 1-2 or Table 1-4 above, can be used for transmission of a base sequence on the semi-persistent HARQ-ACK PUCCH resource.

In one another embodiment, a PUCCH transmission configured with PUCCH format 0/1 carrying 2-bit dynamic HARQ-ACK may overlap partially or fully within a slot with a semi-persistent HARQ-ACK transmission configured with PUCCH format 0/1, where the semi-persistent HARQ-ACK transmission may be configured to start either earlier than, or later than, or at the same time as the dynamic HARQ-ACK.

As PUCCH formats 0 and 1 can carry up to 2 bits, the HARQ-ACK for the latest PDSCH (whether it is for semi-static or dynamic PDSCH) may be transmitted using the PUCCH format scheduled for the HARQ-ACK in order to support a single PUCCH transmission. The other HARQ-ACK and its PUCCH may be dropped.

In another embodiment, the HARQ-ACK for dynamic physical downlink shared channel (PDSCH) may be prioritized and transmitted using the PUCCH format scheduled for the dynamic HARQ-ACK, and the semi-persistent HARQ-ACK and its PUCCH can be dropped. Alternatively, the semi-persistent HARQ-ACK may be prioritized and transmitted using the PUCCH format configured for the semi-persistent HARQ-ACK, and the dynamic HARQ-ACK and its PUCCH can be dropped.

In one another embodiment, the earlier PUCCH and its HARQ-ACK are transmitted and the other PUCCH and its HARQ-ACK can be dropped. Any of the above mentioned transmission schemes to drop one HARQ-ACK type and its PUCCH can be applied to the cases of a single HARQ-ACK bit for both dynamic and semi-persistent HARQ-ACKs.

In one another embodiment, bundling of the semi-persistent and dynamic HARQ-ACK bits into a single HARQ-ACK bit can be applied. For instance, in cases that all the HARQ-ACK bits correspond to 'ACK', an 'ACK' bit can be transmitted on the PUCCH resource scheduled for the dynamic HARQ-ACK and if at least one HARQ-ACK bit is 'NACK', a 'NACK' bit can be transmitted on the PUCCH resource scheduled for the dynamic HARQ-ACK while dropping the semi-persistent HARQ-ACK PUCCH. Alternatively, the PUCCH configured for the semi-persistent HARQ-ACK can be used to carry the bundled HARQ-ACK bit.

Embodiments herein provide mechanism for handling partial overlapping of multiple uplink signals for NR systems. Embodiments may include handling partial overlapping of two short physical uplink control channels (PUCCHs); handling partial overlapping of two long PUCCHs; handling partial overlapping of short and long PUCCHs; and handling partial overlapping of PUCCH and physical uplink shared channel (PUSCH).

As mentioned above, in case of partial overlapping between multiple uplink signals/channels, some mechanisms need to be defined. As a general rule, embodiments of handling partial overlapping between multiple uplink channels/signals are provided as follows. In some embodiments, in case of partial overlapping of multiple uplink signals and/or channels, UE only transmits one of the uplink signals and/or channels while other uplink signals and/or channels are dropped. The dropping rule may depend on the priority of the UCI type carried by the uplink channels. In one option, HARQ-ACK may have higher priority than other UCI types, while CSI report may have higher priority than SR. In addition, PUCCH carrying beam recovery request may have higher priority than other physical uplink signals/channels. In another option, the dropping rule may depend on the transmission time of multiple uplink signals/channels. In one option, UE transmits the first uplink signal/channel with earliest time instance and drops others.

In another option, the dropping rule may depend on the traffic type. For instance, when UE supports both ultra-reliable low-latency communication (URLLC) and enhanced mobile broadband (eMBB) services, UE may drop the uplink signals/channels for eMBB service and only transmit the uplink signal/channel for URLLC traffic. In another option, the dropping rule may depend on the transmission duration of the uplink signals/channels. In one option, UE would drop the uplink signals/channels with shortest duration and transmit the uplink signal/channel with longest duration or vice versa. In another option, whether to drop the uplink signal/channel with shortest or longest duration can be configured by higher layers via NR minimum system information (MSI), NR remaining minimum system information (RMSI), NR other system information (OSI) or radio resource control (RRC) signaling.

In other embodiments, in case of partial overlapping of multiple uplink channels, on the colliding symbols, UE may multiplex multiple UCI types and carry them into one of multiple uplink channels in accordance with the rule used for simultaneous transmission of multiple UCI types with full overlapping. Further, on the non-colliding symbols, UE may simply transmit the uplink signals/channels with shortened or punctured length. Note that in case of PUCCH with shorten or punctured structure, an orthogonal cover code (OCC) with a shortened length may be applied depending on the shortened duration.

In other embodiments, in case of partial overlapping of multiple uplink channels, on the colliding symbols, UE may only transmit one of the uplink signals and/or channels while other uplink signals and/or channels are dropped in accordance with the priority rules as mentioned above. Further, on the non-colliding symbols, UE may simply transmit the uplink signals/channels with shortened or punctured length.

In other embodiments, a combination of the aforementioned embodiments can be applied for the case of partial overlapping of multiple uplink channels. In one option, in case when two or more uplink channels/signals have the same starting symbol but different durations, depending on transmission duration difference between different uplink channels/signals, UE may drop or multiplex the UCI types into one uplink channel in the colliding symbols.

For instance, if the transmission duration difference between two PUCCHs is greater than X symbols, UE may transmit the first PUCCH with shorter duration in the colliding symbols. Further, UE may start to transmit the second PUCCH with longer duration after the first PUCCH using punctured or shortened structure. If the transmission duration difference between two PUCCHs is less than X symbols, UE may multiplex multiple UCI types into one of the first and second PUCCHs in the colliding symbols. Further, UE may start to transmit the second PUCCH with longer duration after the first PUCCH using punctured or shortened structure. Note that in the above option, X can be predefined in the specification or configured by higher layers via MSI, RMSI, OSI or RRC signaling.

Handling Collision in Case of Partial Overlapping of Two Short PUCCHs

Figure 7:
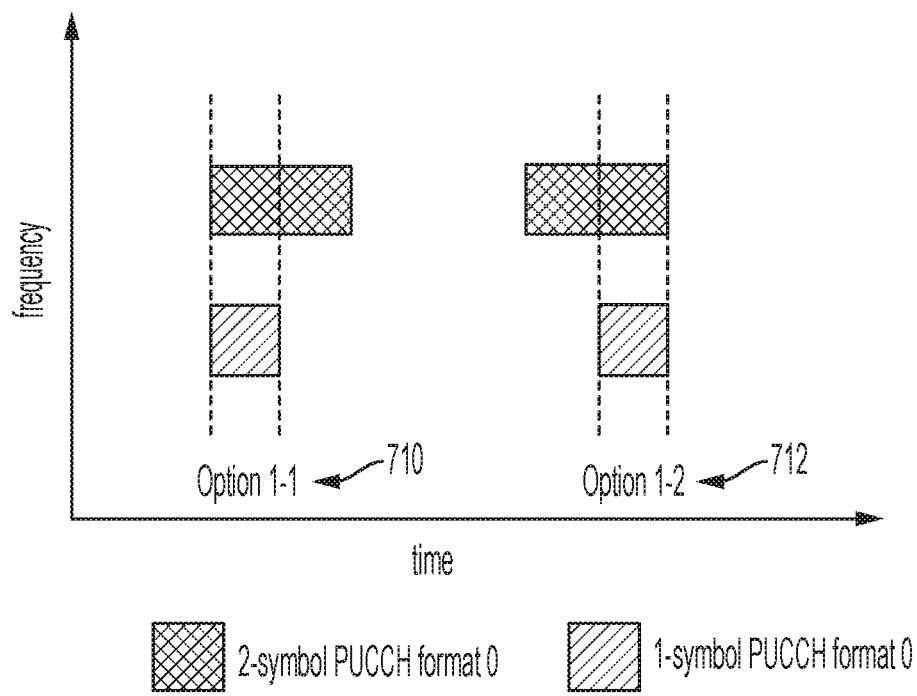
FIG. 7 is a diagram of partial overlapping of two short PUCCHs of format 0 in accordance with one or more embodiments.

Referring now to FIG. 7, a diagram of partial overlapping of two short PUCCHs of format 0 in accordance with one or more embodiments will be discussed. In some embodiments, a 2-symbol short PUCCH (format 0) carrying HARQ-ACK feedback may partially overlap with a 1-symbol short PUCCH (format 0) semi-statically configured for SR transmission, where the 1-symbol PUCCH may overlap in time with either the 1st or the 2nd symbol of 2-symbol PUCCH format 0, as illustrated in FIG. 7. In option 1-1 at 710, the two partially overlapping PUCCHs (both format 0) have the same starting symbol but different durations, whereas in option 1-2 at 712, the two partially overlapping PUCCHs have both different starting symbols and different time durations.

Option 1-1: When 1-symbol short PUCCH (format 0) semi-statically configured for SR transmission collides in time with the first symbol of 2-symbol short PUCCH (format 0) carrying HARQ-ACK feedback, SR can be multiplexed with HARQ-ACK in the first symbol of 2-symbol short PUCCH, whereas the second symbol of the 2-symbol short PUCCH will carry only HARQ-ACK bits. Two different cyclic shifted versions of a base sequence, typically a length-12 low PAPR (peak-to-average power ratio, computer generated sequence (CGS) will be transmitted during the first and second symbols of 2-symbol short PUCCH depending on the transmitted UCI types as per tables 1-1 through 1-4 discussed herein, above.

Here, $CS_{initial}$ is the index of initial cyclic shift (UE specific) of HARQ-ACK only transmission and a fixed mapping pattern, shown in Tables 1-1 through 1-4 above, is used to choose the cyclic shift values of the base sequence to be transmitted during the first and the second symbol durations of 2-symbol PUCCH format 0, depending on the UCI type, whether HARQ-ACK only transmission, during second symbol, or simultaneous HARQ-ACK and positive SR transmission during first symbol.

Option 1-2: When 1-symbol short PUCCH (format 0) semi-statically configured for SR transmission collides in time with the second symbol of 2-symbol short PUCCH (format 0) carrying HARQ-ACK feedback, different solutions can exist depending on the priority of HARQ-ACK and SR. If HARQ-ACK has higher priority than SR, then SR (semi-statically configured with 1-symbol PUCCH format 0) will be dropped or delayed until the end of HARQ-ACK transmission or UE transmits the SR on the next available opportunity. If SR has higher priority than HARQ-ACK, then HARQ-ACK (on 2-symbol PUCCH format 0) will be dropped. For instance, for URLLC application, SR may have higher priority to ensure ultra-low latency application. In this case, HARQ-ACK is dropped.

In other embodiments, a 2-symbol short PUCCH (format 0) carrying HARQ-ACK feedback may partially overlap with a 2-symbol short PUCCH (format 0) semi-statically configured for SR transmission. Note that in this case, the above embodiments can be applied on the collided symbol. For instance, UE may transmit the HARQ-ACK and SR on the colliding symbol according to the rule specified for the simultaneous transmission of HARQ-ACK and SR in case of fully overlapping. For non-colliding symbols, UE may simply transmit the HARQ-ACK or SR based on the configuration. Alternatively, in case of partial overlapping of 2-symbol short PUCCH carrying HARQ-ACK and SR, respectively, dropping rule can be defined. For instance, HARQ-ACK may have higher priority than SR. In this case, 2-symbol short PUCCH carrying SR is dropped.

Figure 8:
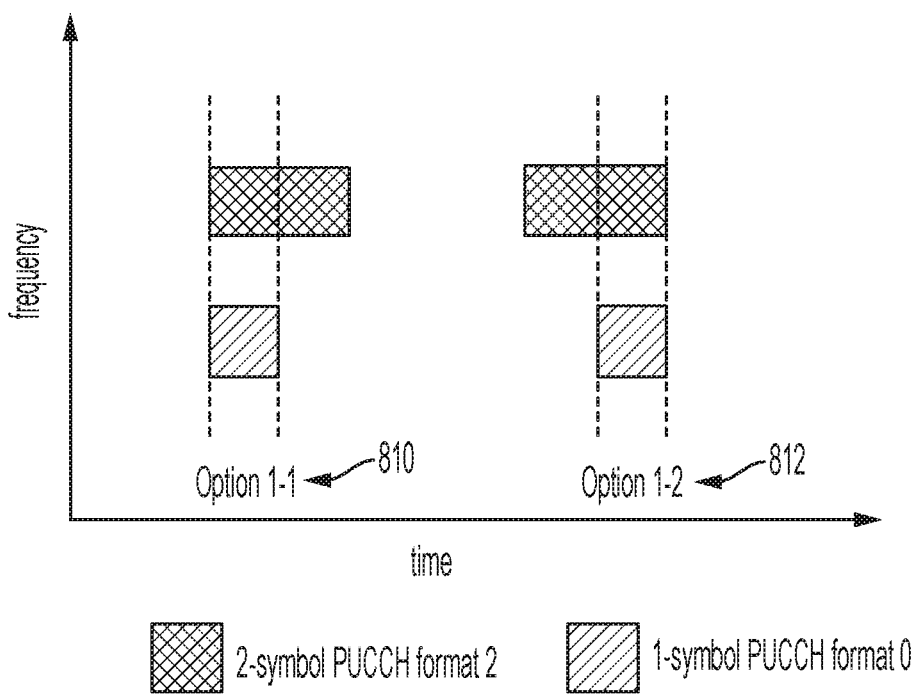
FIG. 8 is a diagram of partial overlapping of two short PUCCHs of format 2 and format 0 in accordance with one or more embodiments.

Referring now to FIG. 8, a diagram of partial overlapping of two short PUCCHs for format 2 and format 0 in accordance with one or more embodiments will be discussed. In some embodiments, 2-symbol short PUCCH (format 2) carrying HARQ-ACK with/without CSI feedback may collide either in the first or in the second symbol with 1-symbol short PUCCH (format 0) semi-statically configured for SR transmission as illustrated in FIG. 8. In option 1-1 at 810, the two partially overlapping PUCCHs (format 0 and format 2) have the same starting symbol but different durations, whereas in option 1-2 at 812, the two partially overlapping PUCCHs have both different starting symbols and different durations in time.

Option 1-1: when 1-symbol short PUCCH (format 0) semi-statically configured for SR transmission collides in time with the first symbol of a 2-symbol short PUCCH (format 2) carrying HARQ-ACK (with/without CSI feedback), UE would append the SR bit after the HARQ-ACK (with/without CSI) information bits and carry the jointly encoded HARQ-ACK (with/without CSI) and SR bits on PUCCH format 2 by mapping the encoded bits across 2 symbols of 2-symbol short PUCCH format 2.

Option 1-2: when 1-symbol short PUCCH (format 0) semi-statically configured for SR transmission collides in time with the second symbol of 2-symbol short PUCCH (format 2) carrying HARQ-ACK with/without CSI feedback, different solutions can exist depending on the priority of HARQ-ACK with/without CSI) and SR. If HARQ-ACK (with/without CSI) has higher priority than SR, then SR (semi-statically configured with 1-symbol PUCCH format 0) will be dropped. If SR has higher priority than HARQ-ACK (with/without CSI), then HARQ-ACK (with/without CSI) will be dropped.

In other embodiments, a 2-symbol short PUCCH (format 2) carrying HARQ-ACK with/without CSI feedback may partially collide with a 2-symbol short PUCCH (format 0) semi-statically configured for SR transmission. In one option, on the colliding symbols, the above embodiments can be applied. On the non-colliding symbols, UE transmits the PUCCH format 2 or 0 accordingly.

Alternatively, UE would drop one of PUCCH format 0 or 2 in case of partial overlapping. This may depend on the priority of UCI type carried by PUCCH format 0 or 2. For instance, HARQ-ACK may have higher priority than SR and CSI report. In yet another option, UE may transmit the short PUCCH with earlier starting symbol and drop the latter one. This may apply for the case of same PUCCH format or same UCI type carried by two short PUCCHs.

Handling Collision in Case of Partial Overlapping of Two Long PUCCHs

In some embodiments, a first N-symbol long PUCCH format 1 (N can be any integer value between 4 and 14) semi-statically configured for SR transmission partially overlaps with a second M-symbol long PUCCH (M can be any integer between 4 and 14 and M may or may not be equal to N) format 1/3/4 carrying HARQ-ACK (with/without CSI feedback for PUCCH format 3/4). Several scenarios can be considered based on the partially overlapping PUCCH format types and the overlapping configuration (i.e. starting symbol and duration of each PUCCHs), as explained below.

Figure 9:
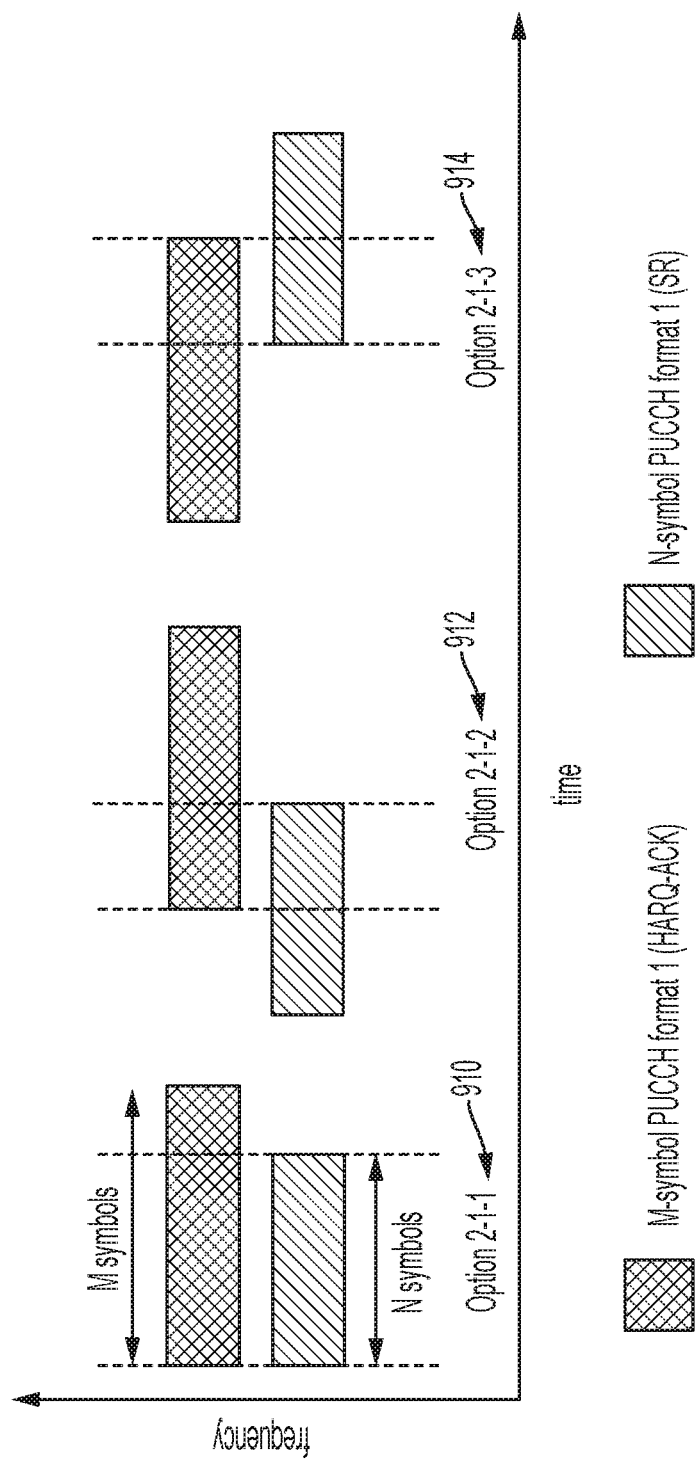
FIG. 9 is a diagram of partial overlapping of two long PUCCHs both of format 1 in accordance with one or more embodiments.

Referring now to FIG. 9, a diagram of partial overlapping of two long PUCCHs both of format 1 in accordance with one or more embodiments will be discussed. Option 2-1: An M-symbol long PUCCH format 1 carrying HARQ-ACK bits may partially overlap with an N-symbol long PUCCH format 1 semi-statically configured for SR, where the two PUCCHs may have the same starting symbol and different durations (i.e. N≠M) or different starting symbols and same (N=M) or different (N≠M) durations, as illustrated in FIG. 9. Three configurations of partial overlapping between two long PUCCHs, each being PUCCH format 1 may exist.

In some embodiments, an M-symbol long PUCCH format 1 carrying HARQ-ACK bits may overlap with an N-symbol long PUCCH format 1 semi-statically configured for SR transmission, where the starting symbols are the same for both the PUCCHs, but the duration is different, i.e. N≠M shown by option 2-1-1 at 910 of FIG. 9. In this case, HARQ-ACK and SR can be multiplexed on M-symbol PUCCH format 1 using the same principle as in LTE PUCCH format 1a/1b.

In other embodiments, SR transmission using N-symbol long PUCCH format 1 may start before the advent of HARQ-ACK transmission using M-symbol PUCCH format 1, where M may or may not be equal to N shown by option 2-1-2 at 612 of FIG. 9. In this case, the N-symbol long PUCCH format 1 transmitting SR is terminated earlier, at the starting symbol of M-symbol PUCCH format 1, and SR is multiplexed on M-symbol PUCCH format 1 carrying HARQ-ACK, following the similar multiplexing principle of LTE PUCCH format 1a/1b.

In other embodiments, SR may be semi-statically configured on N-symbol long PUCCH format 1 in the middle of the transmission of HARQ-ACK using M-symbol PUCCH format 1, where M may or may not be equal to N, i.e. HARQ-ACK transmission starts before the SR opportunity occurs as shown by option 2-1-3 at 914 of FIG. 9. In this case, either the SR is dropped or delayed until the end of HARQ-ACK transmission.

Figure 10:
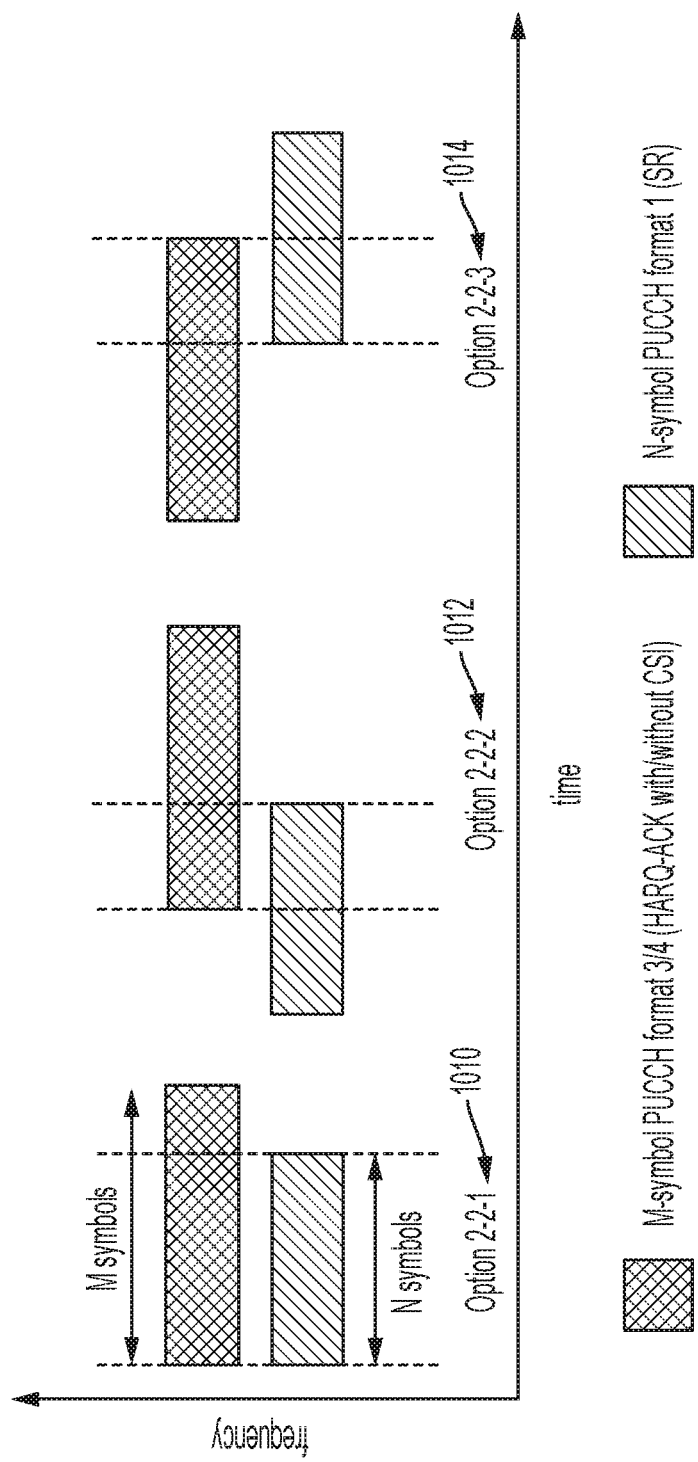
FIG. 10 is a diagram of partial overlapping of two long PUCCHs for format 1 and format 3/4 in accordance with one or more embodiments.

Referring now to FIG. 10, a diagram of partial overlapping of two long PUCCHs for format 1 and format 3/4 in accordance with one or more embodiments will be discussed. Option 2-2: An M-symbol long PUCCH format 3/4 carrying HARQ-ACK (with/without CSI) bits may partially overlap with an N-symbol long PUCCH format 1 semi-statically configured for SR, where the two PUCCHs may have the same starting symbol and different durations (i.e. N≠M) or different starting symbols and same (N=M) or different (N≠M) durations, as illustrated in FIG. 10. Three configurations of partial overlapping between two long PUCCHs, one being PUCCH format 1 and the other PUCCH format 3/4 may exist.

In some embodiments, an M-symbol long PUCCH format 3/4 indicated for HARQ-ACK (with/without CSI) transmission may overlap with an N-symbol long PUCCH format 1 semi-statically configured for SR transmission, where the starting symbols are the same for both the PUCCHs, but the duration is different, i.e. N≠M as shown by option 2-2-1 in FIG. 10. In this case, SR can be jointly encoded with HARQ-ACK bits (with/without CSI) on M-symbol PUCCH format 3/4.

In other embodiments, SR transmission using N-symbol long PUCCH format 1 may start before the advent of HARQ-ACK transmission using M-symbol PUCCH format 3/4, where M may or may not be equal to N as shown by option 2-2-2 at 1012 in FIG. 10. In this case, the N-symbol long PUCCH format 1 transmitting SR is terminated earlier, at the starting symbol of M-symbol PUCCH format 3/4, and SR is multiplexed on M-symbol PUCCH format 3/4 by jointly encoding with HARQ-ACK bits (with/without CSI).

In other embodiments, SR may be semi-statically configured on N-symbol long PUCCH format 1 in the middle of the transmission of HARQ-ACK using M-symbol PUCCH format 3/4, where M may or may not be equal to N, i.e. HARQ-ACK transmission starts before the SR opportunity occurs as shown by option 2-2-3 at 1014 in FIG. 10. In this case, either the SR is dropped or delayed until the end of HARQ-ACK transmission.

In other embodiments, in case of partial overlapping of two long PUCCHs, due to the fact that two long PUCCHs may not be multiplexed in a time division multiplexing (TDM) manner, UE may simply drop one of long PUCCHs which has lower priority. The dropping rule may be specified in accordance with the embodiments as mentioned above.

Handling Collision in Case of Partial Overlapping of Short and Long PUCCHs

In some embodiments, a 1 or 2-symbol short PUCCH (PUCCH format 0) semi-statically configured for SR transmission partially collides with a 4-14 symbol long PUCCH (PUCCH formats 1/3/4) indicated to transmit HARQ-ACK bits (with/without CSI for PUCCH formats 3/4). The following cases may be considered as partial overlapping scenarios.

Option 3-1: if 1 or 2-symbol short PUCCH format 0 semi-statically configured for SR has the same starting symbol as the long PUCCH (format 1/3/4) scheduled for HARQ-ACK transmission, then an SR bit can be appended with the HARQ-ACK bits on long PUCCH (format 1/3/4) and transmitted. Option 3-2: 1 or 2-symbol short PUCCH format 0 semi-statically configured for SR has different starting symbol than the long PUCCH (format 1/3/4) scheduled for HARQ-ACK transmission. In this case, SR is dropped or delayed until the end of long PUCCH transmission if HARQ-ACK has higher priority than SR. On the other hand, if SR has higher priority than HARQ-ACK, then long PUCCH transmission (using format 1/3/4) is discontinued and only SR is transmitted using 1 or 2-symbol PUCCH format 0.

Handling Collision in Case of Partial Overlapping of PUCCH and PUSCH

In the case when PUCCH and PUSCH fully overlaps, UE would piggyback the UCI on PUSCH and drop PUCCH, i.e., in case when PUCCH and PUSCH have the same starting symbols and duration. However, in case of partial overlapping of PUCCH and PUSCH, embodiments of handling collision are provided as follows. In some embodiments, UE only transmits the PUCCH or PUSCH in accordance with the dropping rule as mentioned above. For instance, if PUCCH carrying HARQ-ACK feedback spans one or two symbols, UE may drop the PUSCH transmission or piggyback HARQ-ACK on PUSCH depending on the processing timeline. In another example, in case when PUCCH carrying SR partially collides with PUSCH, UE drops PUCCH carrying SR and transmits the PUSCH.

Figure 11:
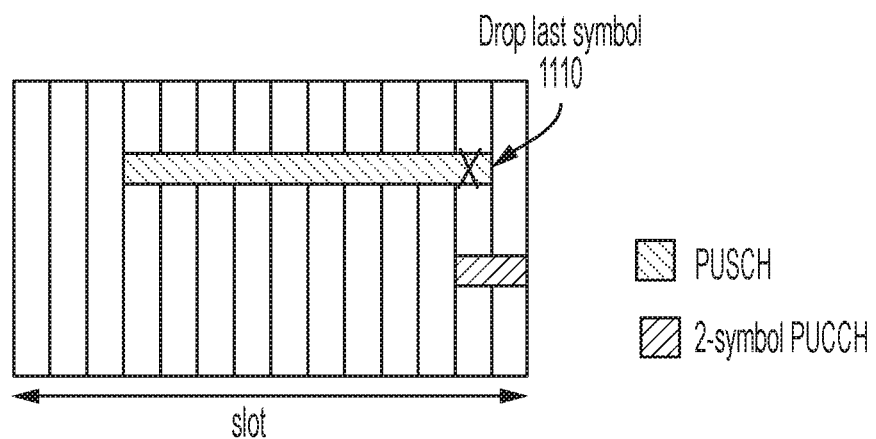
FIG. 11 is a diagram of a first option of partial overlapping of PUCCH and PUSCH in accordance with one or more embodiments.
Figure 12:
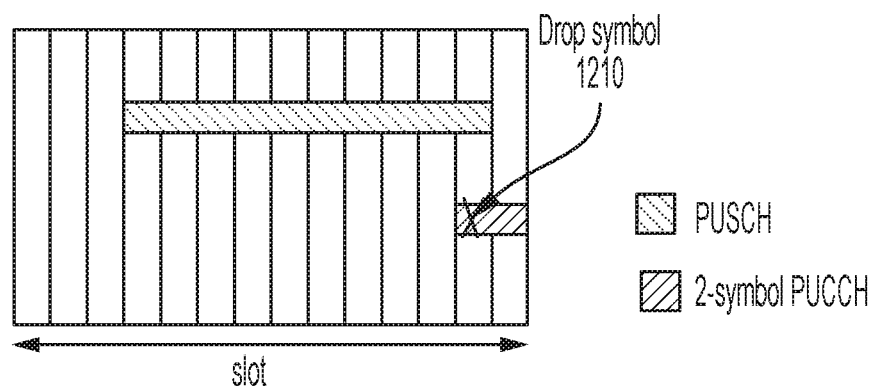
FIG. 12 is a diagram of a second option of partial overlapping of PUCCH and PUSCH in accordance with one or more embodiments.

Referring now to FIG. 11, a diagram of a first option of partial overlapping of PUCCH and PUSCH in accordance with one or more embodiments will be discussed. In other embodiments, in the case of partial overlapping of PUCCH or PUSCH, UE may puncture or rate-match the PUSCH on the colliding symbols and transmit the PUCCH. FIG. 11 illustrates one example of partial overlapping of PUCCH and PUSCH. In the example, in the colliding symbols, UE transmit the PUCCH and drop the last symbol 1110 of PUSCH transmission Referring now to FIG. 12, a diagram of a second option of partial overlapping of PUCCH and PUSCH in accordance with one or more embodiments will be discussed. In other embodiments, in case of partial overlapping of PUCCH and PUSCH, UE may drop the PUCCH on the colliding symbols and transmit the PUSCH. FIG. 12 illustrates one example of partial overlapping of PUCCH or PUSCH. In the example, in the colliding symbols, UE transmit the PUSCH and drop the first symbol 1210 of PUCCH transmission. Note that in another option, whether to drop PUCCH or PUSCH in the colliding symbols may depend on the dropping rule or priority rule as mentioned above.

Furthermore, the above embodiments can be straightforwardly extended to the case when sounding reference signal (SRS) partially collides with other uplink channels. This may also depend on whether aperiodic, semi-persistent (SPS) or periodic SRS is transmitted. In one example, in case when SPS or periodic SRS collides with long PUCCH carrying HARQ-ACK, periodic SRS is dropped on the colliding symbols. In case when aperiodic SRS collides with long PUCCH carrying CSI report, long PUCCH carrying CSI report is dropped or punctured on the colliding symbols.

This may also depend on the number of symbols allocated for SRS transmission. In one option, in case when SRS duration>=Y symbols, long PUCCHs may be dropped, otherwise SRS is dropped. Here Y can be predefined in the specification or configured by higher layers via MSI, RMSI, OSI or RRC signaling.

The design concept may also extend to the case for long PUCCH over multiple slots. In the case when PUSCH or short PUCCH or SRS collides partially with long PUCCH in one or more slots within aggregated slots, UE may first determine whether long PUCCH in the concerned slot is dropped. The dropping rule may be defined as mentioned above or may depend on the number of available symbols for long PUCCH in the concerned slot.

Figure 13:
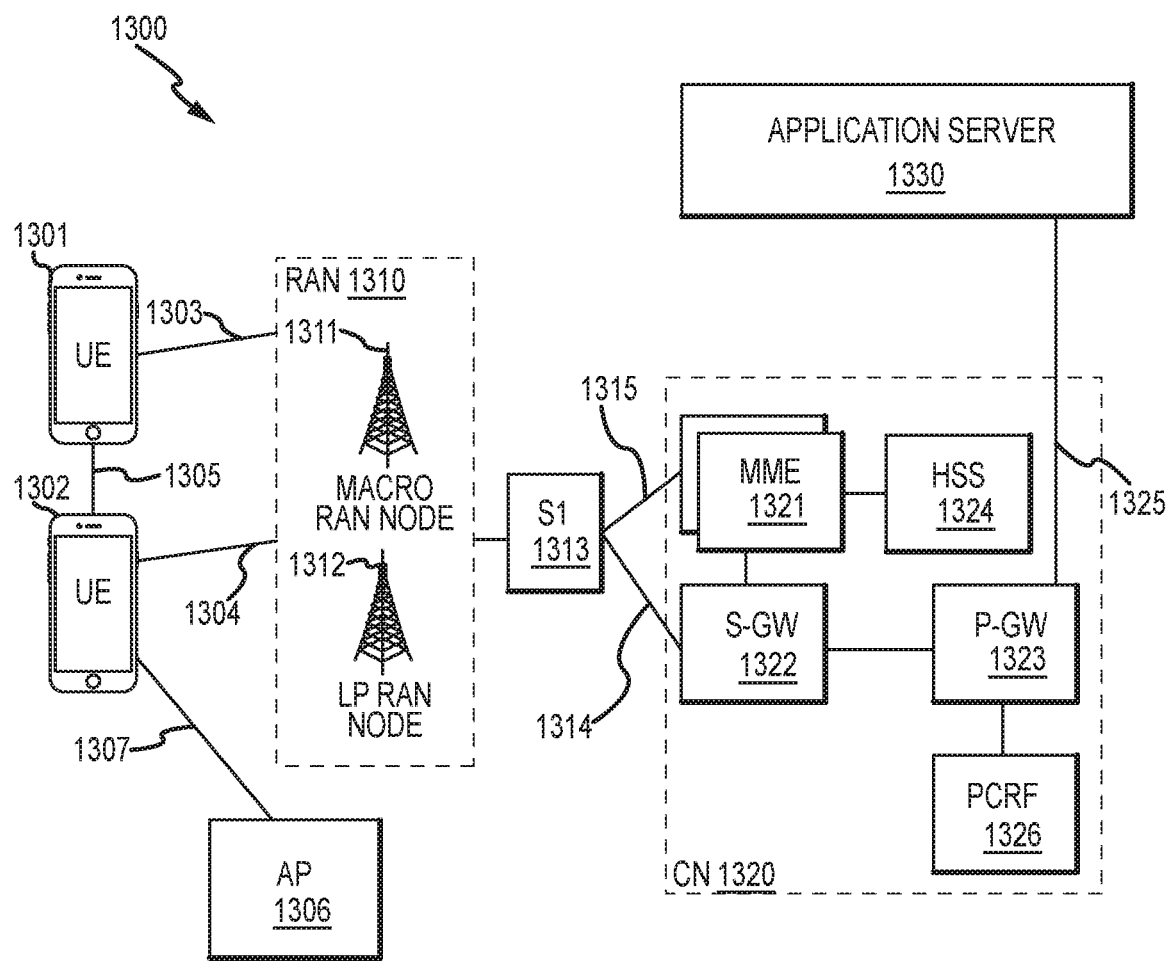
FIG. 13 illustrates an architecture of a system of a network in accordance with some embodiments.

FIG. 13 illustrates an architecture of a system 1300 of a network in accordance with some embodiments. The system 1300 is shown to include a user equipment (UE) 1301 and a UE 1302. The UEs 1301 and 1302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1301 and 1302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 and 1302 may be configured to connect, e.g., communicatively couple, with a radio access network (RAN) 1310—the RAN 1310 may be, for example, an Evolved Universal Mobile Telecommunications System (UMTS) Terrestrial Radio Access Network (E-UTRAN), a NextGen RAN (NG RAN), or some other type of RAN. The UEs 1301 and 1302 utilize connections 1303 and 1304, respectively, each of which comprises a physical communications interface or layer (discussed in further detail below); in this example, the connections 1303 and 1304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1301 and 1302 may further directly exchange communication data via a ProSe interface 1305. The ProSe interface 1305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1302 is shown to be configured to access an access point (AP) 1306 via connection 1307. The connection 1307 can comprise a local wireless connection, such as a connection consistent with any IEEE 802.11 protocol, wherein the AP 1306 would comprise a wireless fidelity (WiFi®) router. In this example, the AP 1306 is shown to be connected to the Internet without connecting to the core network of the wireless system (described in further detail below).

The RAN 1310 can include one or more access nodes that enable the connections 1303 and 1304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1310 may include one or more RAN nodes for providing macrocells, e.g., macro RAN node 1311, and one or more RAN nodes for providing femtocells or picocells (e.g., cells having smaller coverage areas, smaller user capacity, or higher bandwidth compared to macrocells), e.g., low power (LP) RAN node 1312.

Any of the RAN nodes 1311 and 1312 can terminate the air interface protocol and can be the first point of contact for the UEs 1301 and 1302. In some embodiments, any of the RAN nodes 1311 and 1312 can fulfill various logical functions for the RAN 1310 including, but not limited to, radio network controller (RNC) functions such as radio bearer management, uplink and downlink dynamic radio resource management and data packet scheduling, and mobility management.

In accordance with some embodiments, the UEs 1301 and 1302 can be configured to communicate using Orthogonal Frequency-Division Multiplexing (OFDM) communication signals with each other or with any of the RAN nodes 1311 and 1312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 and 1312 to the UEs 1301 and 1302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1301 and 1302. The physical downlink control channel (PDCCH) may carry information about the transport format and resource allocations related to the PDSCH channel, among other things. It may also inform the UEs 1301 and 1302 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 1311 and 1312 based on channel quality information fed back from any of the UEs 1301 and 1302. The downlink resource assignment information may be sent on the PDCCH used for (e.g., assigned to) each of the UEs 1301 and 1302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1310 is shown to be communicatively coupled to a core network (CN) 1320—via an S1 interface 1313. In embodiments, the CN 1320 may be an evolved packet core (EPC) network, a NextGen Packet Core (NPC) network, or some other type of CN. In this embodiment the S1 interface 1313 is split into two parts: the S1-U interface 1314, which carries traffic data between the RAN nodes 1311 and 1312 and the serving gateway (S-GW) 1322, and the S1-mobility management entity (MME) interface 1315, which is a signaling interface between the RAN nodes 1311 and 1312 and MMEs 1321.

In this embodiment, the CN 1320 comprises the MMEs 1321, the S-GW 1322, the Packet Data Network (PDN) Gateway (P-GW) 1323, and a home subscriber server (HSS) 1324. The MMEs 1321 may be similar in function to the control plane of legacy Serving General Packet Radio Service (GPRS) Support Nodes (SGSN). The MMEs 1321 may manage mobility aspects in access such as gateway selection and tracking area list management. The HSS 1324 may comprise a database for network users, including subscription-related information to support the network entities' handling of communication sessions. The CN 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc.

The S-GW 1322 may terminate the S1 interface 1313 towards the RAN 1310, and routes data packets between the RAN 1310 and the CN 1320. In addition, the S-GW 1322 may be a local mobility anchor point for inter-RAN node handovers and also may provide an anchor for inter-3GPP mobility. Other responsibilities may include lawful intercept, charging, and some policy enforcement.

The P-GW 1323 may terminate an SGi interface toward a PDN. The P-GW 1323 may route data packets between the EPC network 1323 and external networks such as a network including the application server 1330 (alternatively referred to as application function (AF)) via an Internet Protocol (IP) interface 1325. Generally, the application server 1330 may be an element offering applications that use IP bearer resources with the core network (e.g., UMTS Packet Services (PS) domain, LTE PS data services, etc.). In this embodiment, the P-GW 1323 is shown to be communicatively coupled to an application server 1330 via an IP communications interface 1325. The application server 1330 can also be configured to support one or more communication services (e.g., Voice-over-Internet Protocol (VoIP) sessions, PTT sessions, group communication sessions, social networking services, etc.) for the UEs 1301 and 1302 via the CN 1320.

The P-GW 1323 may further be a node for policy enforcement and charging data collection. Policy and Charging Enforcement Function (PCRF) 1326 is the policy and charging control element of the CN 1320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate Quality of Service (QoS) and charging parameters. The PCRF 1326 may provision this rule into a Policy and Charging Enforcement Function (PCEF) (not shown) with the appropriate traffic flow template (TFT) and QoS class of identifier (QCI), which commences the QoS and charging as specified by the application server 1330.

Figure 14:
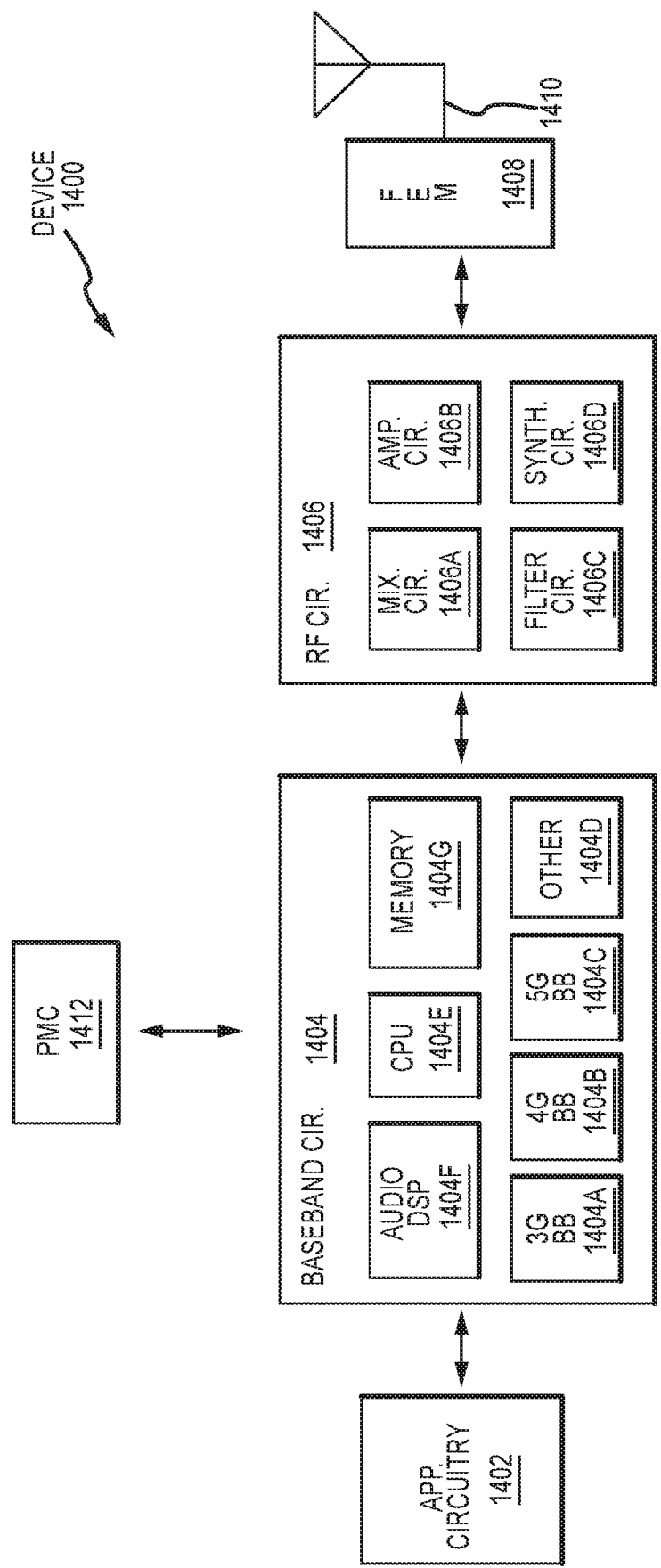
FIG. 14 illustrates example components of a device in accordance with some embodiments.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404A, a fourth generation (4G) baseband processor 1404B, a fifth generation (5G) baseband processor 1404C, or other baseband processor(s) 1404D for other existing generations, generations in development or to be developed in the future (e.g., second generation (2G), sixth generation (6G), etc.). The baseband circuitry 1404 (e.g., one or more of baseband processors 1404A-D) may handle various radio control functions that enable communication with one or more radio networks via the RF circuitry 1406. In other embodiments, some or all of the functionality of baseband processors 1404A-D may be included in modules stored in the memory 1404G and executed via a Central Processing Unit (CPU) 1404E. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404F. The audio DSP(s) 1404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively. In some embodiments, the mixer circuitry 1406*a* of the receive signal path and the mixer circuitry 1406*a* of the transmit signal path may include two or more mixers and may be arranged for image rejection (e.g., Hartley image rejection). In some embodiments, the mixer circuitry 1406*a* of the receive signal path and the mixer circuitry 1406*a* may be arranged for direct downconversion and direct upconversion, respectively. In some embodiments, the mixer circuitry 1406*a* of the receive signal path and the mixer circuitry 1406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect. In some embodiments, the synthesizer circuitry 1406*d* may be a fractional-N synthesizer or a fractional N/N+1 synthesizer, although the scope of the embodiments is not limited in this respect as other types of frequency synthesizers may be suitable. For example, synthesizer circuitry 1406*d* may be a delta-sigma synthesizer, a frequency multiplier, or a synthesizer comprising a phase-locked loop with a frequency divider.

The synthesizer circuitry 1406*d* may be configured to synthesize an output frequency for use by the mixer circuitry 1406*a* of the RF circuitry 1406 based on a frequency input and a divider control input. In some embodiments, the synthesizer circuitry 1406*d* may be a fractional N/N+1 synthesizer.

In some embodiments, frequency input may be provided by a voltage-controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406*d* of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM 1408, or in both the RF circuitry 1406 and the FEM 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM 1408.

In some embodiments, the PMC 1412 may control, or otherwise be part of, various power saving mechanisms of the device 1400. For example, if the device 1400 is in an RRC Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it must transition back to RRC Connected state.

An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
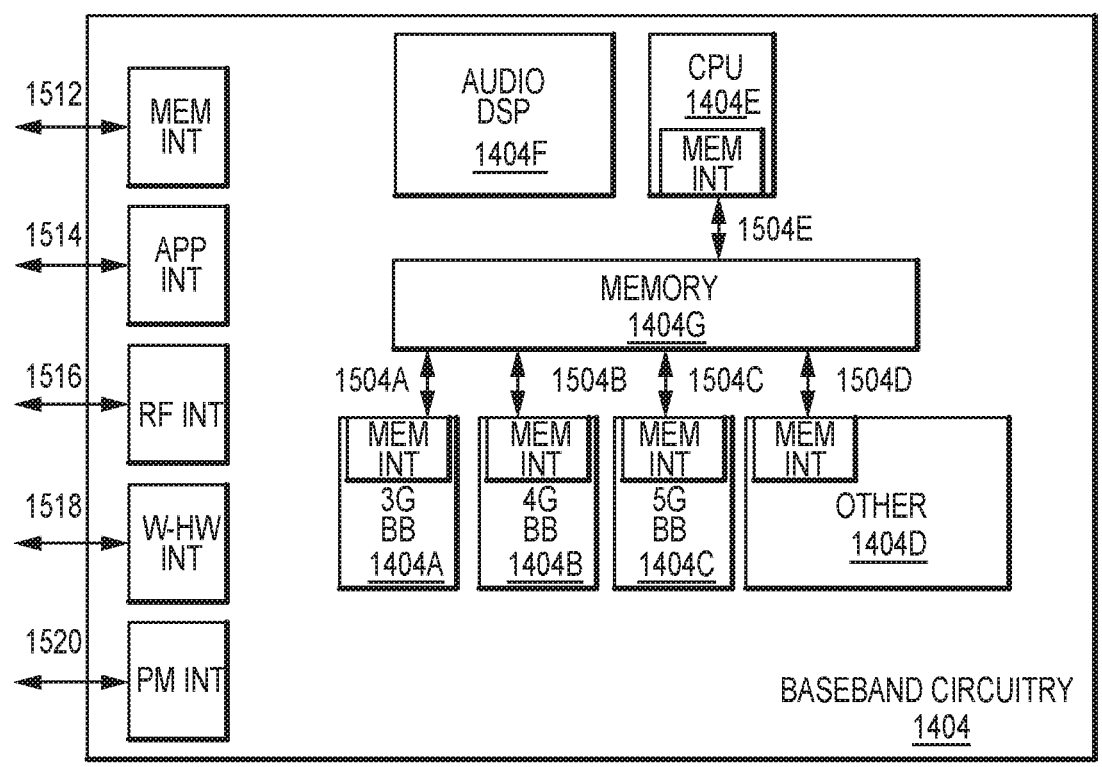
FIG. 15 illustrates example interfaces of baseband circuitry in accordance with some embodiments.

FIG. 15 illustrates example interfaces of baseband circuitry in accordance with some embodiments. As discussed above, the baseband circuitry 1404 of FIG. 14 may comprise processors 1404A-1404E and a memory 1404G utilized by said processors. Each of the processors 1404A-1404E may include a memory interface, 1504A-1504E, respectively, to send/receive data to/from the memory 1404G.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412.

In the present description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to handling overlapping of PUCCH and PUSCH for new radio systems and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE) to operate in a New Radio (NR) network, comprising:
radio frequency (RF) circuitry configured to communicate with the NR network; and
one or more baseband processors communicatively coupled to the RF circuitry and configured to perform operations, comprising:
determining if two or more uplink signals overlap;
determining a rule for transmitting the two or more uplink signals and to perform a transmission according to the rule; and
appending X number of bits to one of the two or more uplink signals indicating a scheduling request (SR) state when i) the two or more uplink signals comprise a physical uplink control channel (PUCCH) format 2, 3, or 4, ii) the two or more uplink signals comprise a PUCCH format 0 or 1, iii) the PUCCH format 2, 3, or 4 is configured to carry one or more of a hybrid automatic repeat request acknowledgment (HARQ-ACK) and a channel state information (CSI) and iv) the PUCCH format 2, 3, or 4 overlaps with a number of configured SR transmission occasions.

2. The apparatus of claim 1, wherein the rule indicates that the UE is to transmit only one of the two or more uplink signals while other uplink signals are dropped.

3. The apparatus of claim 1, wherein the rule indicates that the UE is to drop a scheduling request (SR) and transmit a hybrid automatic repeat request acknowledgment (HARQ-ACK) on a physical uplink control channel (PUCCH) when the two or more uplink signals comprise i) a PUCCH format 1 carrying HARQ-ACK and ii) a PUCCH format 0 or 1 configured for SR.

4. The apparatus of claim 1, wherein the rule indicates that the UE is to transmit only one PUCCH signal and drop other PUCCH signals.

5. The apparatus of claim 1, wherein the rule indicates that the UE is to drop a physical uplink control channel (PUCCH) signal carrying a channel state information (CSI) report.

6. An apparatus of a user equipment (UE) to operate in a New Radio (NR) network, comprising:

radio frequency (RF) circuitry configured to communicate with the NR network; and one or more baseband processors are communicatively coupled to the RF circuitry and configured to perform operations, comprising:

determining if two or more uplink signals overlap;

determining a rule for transmitting the two or more uplink signals and to perform a transmission according to the rule; and multiplexing a scheduling request (SR) on a hybrid automatic repeat request acknowledgment (HARQ-ACK) carrying physical uplink control channel (PUCCH) and generating a sequence for transmission with a cyclic shift of the HARQ-ACK when i) the two or more uplink signals comprise a PUCCH format 0 carrying HARQ-ACK and ii) the two or more uplink signals comprise a PUCCH format 0 or 1 configured for SR.

7. The apparatus of claim 6, wherein the rule indicates that the UE is to transmit only one of the two or more uplink signals while other uplink signals are dropped.

8. The apparatus of claim 6, wherein the rule indicates that the UE is to drop a scheduling request (SR) and transmit a hybrid automatic repeat request acknowledgment (HARQ-ACK) on a physical uplink control channel (PUCCH) when the two or more uplink signals comprise i) a PUCCH format 1 carrying HARQ-ACK and ii) a PUCCH format 0 or 1 configured for SR.

9. The apparatus of claim 6, wherein the rule indicates that the UE is to transmit only one PUCCH signal and drop other PUCCH signals.

10. The apparatus of claim 6, wherein the rule indicates that the UE is to drop a physical uplink control channel (PUCCH) signal carrying a channel state information (CSI) report.

* * * * *